(12) United States Patent
Toida et al.

(10) Patent No.: US 7,292,610 B2
(45) Date of Patent: Nov. 6, 2007

(54) MULTIPLEXED DATA PRODUCING APPARATUS, ENCODED DATA REPRODUCING APPARATUS, CLOCK CONVERSION APPARATUS, ENCODED DATA RECORDING MEDIUM, ENCODED DATA TRANSMISSION MEDIUM, MULTIPLEXED DATA PRODUCING METHOD, ENCODED DATA REPRODUCING METHOD, AND CLOCK CONVERSION METHOD

(75) Inventors: Hiroaki Toida, Neyagawashi (JP); Toshiya Takahashi, Ibarakishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 876 days.

(21) Appl. No.: 10/012,565

(22) Filed: Dec. 12, 2001

(65) Prior Publication Data

US 2002/0041609 A1    Apr. 11, 2002

Related U.S. Application Data

(62) Division of application No. 08/888,914, filed on Jul. 7, 1997, now Pat. No. 6,359,910.

(30) Foreign Application Priority Data

Jul. 4, 1996  (JP) ................. 8-174708
Oct. 24, 1996 (JP) ................. 8-281967

(51) Int. Cl.
*H04J 3/04*  (2006.01)
*H04J 3/06*  (2006.01)
*H04N 7/12*  (2006.01)

(52) U.S. Cl. ............... 370/535; 370/503; 370/517; 348/423.1

(58) Field of Classification Search ............... None
See application file for complete search history.

(56) References Cited

U.S. PATENT DOCUMENTS

| 5,502,573 A | 3/1996 | Fujinami ............ 358/339 |
| 5,506,932 A | 4/1996 | Holmes et al. |
| 5,523,795 A | 6/1996 | Ueda |

(Continued)

FOREIGN PATENT DOCUMENTS

CN    1092197 A    9/1994

(Continued)

OTHER PUBLICATIONS

Information Technology—Generic coding of moving pictures and associated audio information—Part I: systems, ISO/IEC JTC1/SC29/WG11 N0801, Nov. 13, 1994.

(Continued)

*Primary Examiner*—Steven Nguyen
(74) *Attorney, Agent, or Firm*—Steptoe & Johnson LLP

(57) ABSTRACT

A multiplexed data producing apparatus which multiplexes N (integer) pieces of object data in which one of video data, audio data, and digital data is multiplexed to produce one piece of multiplexed data comprises a temporal storage means for temporarily storing the N pieces of object data; a control means for controlling synchronization of time information of each object data for each temporarily stored object data; and a multiplexing means for multiplexing the processed object data to produce multiplexed data.

14 Claims, 25 Drawing Sheets

U.S. PATENT DOCUMENTS 5,566,174 A * 10/1996 Sato et al. .................... 386/96
5,640,388 A *  6/1997 Woodhead et al. ......... 348/464
5,784,119 A     7/1998 Noda et al. ................. 348/423
5,805,602 A     9/1998 Cloutier et al. ............. 348/497
5,835,668 A * 11/1998 Yanagihara .................. 386/95

FOREIGN PATENT DOCUMENTS

| EP | 0 624 983 | 11/1994 |
|---|---|---|
| EP | 0 641 131 | 3/1995 |
| WO | WO96/08115 | 3/1996 |
| WO | WO96/17490 | 6/1996 |

OTHER PUBLICATIONS

Knoll, A., "Syncronisation and buffering aspects in MSDL-M, demultiplexer," ISO/IEC JTC1/SC29/WG11, M0928, TAMPERE, Jul. 1, 1996, pp. 1-5.

* cited by examiner

Fig.11

| ... | c11 | c21 | d11 | d12 | c12 | c22 | d13 | d23 | d14 | d24 | d15 | d25 | ... |

1st digital data : d11,d12,d13,d14,d15
clock information
of 1st digital data : c11,c12
2nd digital data : d21,d22,d23,d24,d25
clock information
of 2nd digital data : c21,c22

Fig.16 (a) data 1 input

| ... | 10 | d11 | 20 | d12 | 30 | d13 | 40 | d14 | ... |
|---|---|---|---|---|---|---|---|---|---|

Fig.16 (b) data 2 input

| ... | 400 | d21 | 410 | d22 | 420 | d23 | 430 | d24 | ... |
|---|---|---|---|---|---|---|---|---|---|

Fig.16 (c) data 1 output

| ... | 100 | d11 | 110 | d12 | 120 | d13 | 130 | d14 | ... |
|---|---|---|---|---|---|---|---|---|---|

Fig.16 (d) data 2 output

| ... | 100 | d11 | 110 | d12 | 120 | d13 | 130 | d14 | ... |
|---|---|---|---|---|---|---|---|---|---|

Fig.16 (e) data 1,2 output

| ... | 100 | d11 | 105 | d21 | 110 | d12 | 115 | d22 | 120 | d13 | 125 | d23 | 130 | d14 | 135 | d24 | ... |
|---|---|---|---|---|---|---|---|---|---|---|---|---|---|---|---|---|---|

Fig.24 Prior Art

| ... | c1 | d11 | d12 | c2 | c22 | d13 | d23 | d14 | d24 | d15 | d25 | ... | digital video data : d11,d12,d13,d14,d15
digital audio data : d21,d22,d23,d24,d25
clock information : c1,c2

MULTIPLEXED DATA PRODUCING
APPARATUS, ENCODED DATA
REPRODUCING APPARATUS, CLOCK
CONVERSION APPARATUS, ENCODED
DATA RECORDING MEDIUM, ENCODED
DATA TRANSMISSION MEDIUM,
MULTIPLEXED DATA PRODUCING
METHOD, ENCODED DATA REPRODUCING
METHOD, AND CLOCK CONVERSION
METHOD

This is a Division of application Ser. No. 08/888,914 filed Jul. 7, 1997, now U.S. Pat. No. 6,359,910.

FIELD OF THE INVENTION

The present invention relates to a multiplexed data producing apparatus, an encoded data reproducing apparatus, a clock conversion apparatus, an encoded data recording medium, an encoded data transmission medium, a multiplexed data producing method, an encoded data reproducing method, and a clock conversion method. More particularly, the present invention relates to production of multiplexed data and synchronization/reproduction of encoded data when digital video, audio, or digital data is multiplexed to be transmitted or to be stored.

BACKGROUND OF THE INVENTION

Recently, with progresses of digitization of data and compression technique, applications of digital images and digital sounds have been developed in broadcasting, CATV or the like. Merits of using digitized data in broadcasting are as follows. i) Since various data including video, sounds, characters or the like may be handled collectedly, integration of services can be provided. ii) By utilizing compression technique in transmitting/receiving data, a great deal of broadcasting of high quality can be performed utilizing a limited transmission bandwidth. iii) Uniform services can be provided using an error correcting technique. iv) High techniques may be utilized with ease as an encryption technique for limited receive.

Packetization is generally employed for transmitting/receiving digitized data or compressed/encoded data. A packet represents an unit of data with entire data divided into a given size. Transmitting/receiving data as a packet allows high efficiency and precision in data communications. For example, in the case of performing exchange of packets in a computer network, respective separate packets are sent to transfer destination at varied timings through a network and reconstructed into original data in the transfer destination, so that information as to the transfer destination, transmission origin or order of packets is added to respective packets.

In the case of handling digital data, use of a packetization technique allows various data such as video, sounds, and character information•additional information to be packetized and combined to make multiplexed data, which is transmitted/received as a transport stream (TS) for transmission. Accordingly, both the compression technique and a multiplexing method of data are important in transmitting the data.

International standards of the multiplexing method of data includes MPEG2 (ISO/IEC 13818-1: Information technology-Generic coding of moving pictures and associated audio: Systems", 1996.4). A description is given of production of multiplexed data according to the MPEG 2 standard and reproduction of the produced multiplexed data in the prior art.

FIGS. 19(a) to 19(c) and 20(a) to 20(e) are diagrams for explaining multiplexed data which is produced according to the MPEG 2 in the prior art, wherein FIG. 19(a) to 19(c) illustrate TSs for use in transmission of digitized data and FIG. 20(a) to 20(e) illustrate packets constituting TSs. A description is given of production of multiplexed data in the prior art with reference to FIGS. 19(a) to 19(c) and FIGS. 20(a) to 20(e).

Video data is compressed/encoded for each frame corresponding to a screen and audio data is compressed/encoded every given sample number such as 1024, and one or a plurality of frames are collected into packets which are refereed to as PES (packetized elementary stream) packets. It should be noted that the given sample number of the audio data represents a frame in the MPEG. FIGS. 20(a) to 20(c) schematically show formats of TS packets as packets constituting TSs. The PES packet includes a header, and the header includes types of subsequent data areas, i.e., a stream ID indicating video data, audio data or the other data, DTS (decoding time stamp) and PTS (presentation time stamp) as time information for synchronization video with audio to be reproduced. The PES packet is divided into a plurality of TS packets of 188 byte length, respectively, to be transmitted or to be stored.

FIGS. 20(d) and 20(e) schematically illustrate formats of TS packets comprising an adaptation field in which various information is included. As shown in figures, the adaptation field includes PCR (program clock reference). The PCR has a time base for encoding data such as video data or audio data, and has the same time base as PTS and DTS.

FIGS. 19(a) to 19(c) schematically show formats of TS packets. The TS packets have numbers inherent in packets, respectively, which are called PIDs (packet identifiers). The same PES packet has the same PID. The TS packets comprise a header, an adaptation field or data part subsequent to the header as shown in FIG. 19(b). The PID of the TS packet is given as a part of the header as shown in FIG. 19(c).

In FIGS. 19(a) to 19(c), a data region of the TS packet may include information as to program selection which is called PSI (program specific information) other than the PES. In the PSI, a number of a program and the PID of the TS packet including video data PES, audio data PES and data PES packets are described. Multiplexed data of a specific program is decoded and reproduced to obtain original images, referring to the PIS.

According to the prior art, the PES packet or the TS packet is produced by adding various information to various data of video data or audio data, resulting in a TS, which is recorded and stored or transmitted.

A description is given of a prior art multiplexed data reproducing apparatus wherein data multiplexed in the MPEG 2 data multiplexing system is decoded/reproduced FIG. 21 is a block diagram illustrating the prior art reproducing apparatus. In the figure, a separating means 2101 is for separating required portion from multiplexed data for each packet, comprising a first buffer 2111 and a CPU 2112. A control means 2102 is for controlling of decoding, comprising a second buffer 2121 and a CPU 2122. A video decoder 2105 is for decoding video data. An audio decoder 2106 is for decoding audio data.

FIG. 22 is a flowchart illustrating a procedure of control of the control means 2102. A description is given of an operation of the prior art MPEG 2 multiplexed data reproducing apparatus constructed above.

As shown in FIG. 21, multiplexed data is input from a recording medium 2107 or a transmission medium 2108 to the buffer 2111, the multiplexed data being stored temporarily therein. The CPU 2112 extracts video PES and audio PES corresponding to a desired program number based on a correspondence between a program and a PID which is obtained from separated PSI and outputs the video PES and the audio PES to a video decoder 2105 and an audio decoder 2106, respectively.

Each decoder performs decoding processing, directed by the control means 2102. FIG. 22 is a flowchart illustrating a processing procedure of control of the control means 2102. A description is given of control procedure of the control means 2102, following a flow in FIG. 22. In step 2201, an STC (system time clock) is obtained as a time base of the decoding apparatus on the basis of PCR in the TS packet. By obtaining the STC, a time base of reproducing apparatus matches a time base of an encoding apparatus. In step 2202, the video decoder 2105 performs decoding to obtain PTS or DTS. Similarly in step 2203, the audio decoder 2106 performs decoding to obtain DTS.

In step 2204, it is decided that whether the video decoder 2105 has started decoding or not and whether the PTS or the DTS which is obtained in step 2202 matches the STC. When it is decided that the video decoder 2105 has not started processing and the PTS or the DTS matches the STC, step 2206 is performed and the video decoder 2105 starts decoding. Similarly, in step 2205, it is decided whether the audio decoder 2106 has started decoding or not and whether the DTS which is obtained in step 2203 matches the STC or not. When it is decided that the audio decoder 2106 has not started processing and the DTS matches the STC, step 2207 is performed and the audio decoder 2106 starts decoding. For decision in step 2204, both PTS and DTS are not used for comparison. The video decoder 2105 and the audio decoder 2106 have the same time base under the control described above, so that synchronization and reproduction are performed, to be displayed.

A description is given of a prior art multiplexed data reproducing apparatus according to the standard MPEG2 (ISO/IEC 13818-1, "Information technology-Generic coding of moving pictures and associated audio information: Systems", 1996.4), in terms of use of clock information.

FIG. 23 is a block diagram illustrating the prior art data reproducing apparatus according to MPEG 2. In the figure, a decoder 2301 is for decoding and reproducing compressed video data and audio data. A buffer 2302 is for storing the data temporarily. A clock extraction circuit 2303 is for extracting clock information from input multiplexed data. A synchronization clock generation circuit 2304 is for generating synchronization clock signals on the basis of input clock information. For example, a PLL (phase locked loop) circuit under a feedback control may be employed to generate the synchronization clock signals. FIG. 24 illustrates multiplexed digital data as an input of the data reproducing apparatus. In the figure, reference characters d11 to d15 designate compressed digital video data, reference characters d21 to d22 designate compressed digital audio data, and reference characters c1 and c2 designate clock information, which have been multiplexed. Clock information includes a value of clocks at 27 MHs of the apparatus which is counted using set modulo.

A description is given of the prior art data reproducing apparatus constructed above. When multiplexed data is input to the apparatus, the clock extraction circuit 2303 separates/extracts the clock information c1 and c2 and outputs the extracted c1 and c2 shown in FIG. 24 to the synchronization clock generation circuit 2304. Video data d11 to d15 and audio data d21 to d25 in FIG. 24 are output to the buffer 2302 and stored therein temporarily for decoding.

The synchronization clock generation circuit 2304 generates synchronized clock signals on the basis of input clock information and outputs the synchronized clock signals to the decoder 2301. The decoder 2301 decodes video data and audio data stored temporarily in the buffer 2302 using the synchronized clock signals, resulting in an output of the apparatus.

FIG. 25 is a diagram for explaining transition of a buffer in the case of decoding video data, where a lateral axis represents time and a longitudinal axis represents a buffer occupation. This figure does not illustrate transition itself of the buffer 2302 in FIG. 23 but illustrates transition of a virtual buffer as a model. Namely, a transition of a buffer defined as a virtual buffer model in MPEG2 is shown in this figure. It is assumed that data is input to the buffer at a given transfer rate through a transmission path and a decoder performs decoding in a short time every 1/30 second, i.e, for each frame. Therefore, data required for decoding of each frame is fetched from the buffer every 1/30 second. In encoding according to MPEG2, buffer status of a decoder is reproduced virtually by using a virtual buffer model and data is sent under control so that overflow and underflow may not occur in the buffer.

Reference numeral 251 in FIG. 25 indicates a normal status. In the normal status, clocks of the reproducing apparatus is synchronized with clocks of the encoding apparatus, so that processing is performed with no overflow or underflow mentioned later. Reference numeral 252 indicates a status in which speed of the clocks of the encoding apparatus is somewhat higher than that of the reproducing apparatus. In this case, since the encoding apparatus operates at high speed, the reproducing apparatus is in a status in which a transfer rate of input becomes higher. As a result, data to be input is more than data to be fetched as represented by 252 and accordingly buffer occupation of 252 becomes significantly higher than that of 251, resulting in overflow above buffer maximum at one point as shown by a and loss of data. On the other hand, in the case of higher speed clocks of the reproducing apparatus, a transfer rate is practically lower. As a result, as represented by 253, occupation becomes lower gradually, resulting in underflow below lower limit as represented by b in the figure which causes discontinuity of reproduction of motion pictures. Thus, when clocks of the encoding apparatus are different from clocks of reproducing apparatus, speed of transmitted data and speed of decoded data are varied from each other, causing overflow or underflow in the buffer of the reproducing apparatus.

For the reason mentioned above, clock information is multiplexed into multiplexed data as shown in FIG. 24 and synchronized clocks obtained on the basis of the clock information are used in the reproducing apparatus, thereby the problem previously mentioned is avoided.

As concerns image encoding, attention has been paid to an object encoding method in which components constituting an image, i.e., a background, characters, moving objects or the like are handled independently, respectively, and encoding is performed for each object. In the object encoding, since encoding is performed for each object, editing such as replacing specific objects can be performed with ease.

However, in production of multiplexed data and decoding and reproduction thereof according to the prior art, the following problem arises. According to the prior art, decoding and reproduction can be performed on the basis of the same time base on the assumption that multiplexed data is produced in the same encoding apparatus. Therefore, for the case of performing object encoding, if each object included in one piece of multiplexed data can be encoded in the same encoding apparatus and can be processed using the same time base, decoding and reproduction can be performed with ease. However, since each object to be edited is not always encoded by the same encoding apparatus, it does not always have the same base. In such case, synchronization and reproduction of objects cannot be performed using the prior art method.

For example, when multiplexed two objects are decoded using clocks synchronized with clocks of one encoding apparatus, one object can be reproduced with ease and clocks for the other object has not been synchronized. As a result, the buffer overflows or underflows, and decoding and reproduction cannot be performed normally.

SUMMARY OF THE INVENTION

It is an object of the present invention to provide a method and an apparatus for producing multiplexed data wherein, for producing multiplexed data on the basis of digital data resulting from an object encoding, when respective objects are encoded in different encoding apparatus, troubles due to lack of synchronization of clocks in reproduction can be avoided.

It is another object of the present invention to provide a method and an apparatus for clock conversion wherein troubles due to lack of synchronization of clocks are avoided in reproduction of multiplexed data with different time base.

It is still another object of the present invention to provide a method and an apparatus for reproducing multiplexed data wherein troubles due to lack of synchronization of clocks are avoided in reproduction of multiplexed data with different time base, thereby smooth reproduction can be realized.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, a multiplexed data producing apparatus which multiplexes N (integer) pieces of object data in which one of video data, audio data, and digital data is multiplexed to produce one piece of multiplexed data comprises a temporal storage means for temporarily storing the N pieces of object data; a control means for controlling synchronization of time information of each object data for each temporarily stored object data; and a multiplexing means for multiplexing the processed object data to produce multiplexed data. Therefore, in the case of encoding objects using their respective encoding apparatus, it is possible to produce multiplexed data with no troubles in reproduction due to lack of synchronization.

According to a second aspect of the present invention, the multiplexed data producing apparatus according to the first aspect wherein, the control means extracts time information of specified object data of the N pieces of object data, extracts the video data, the audio data, and the digital data of object data except the specified object data of the N pieces of object data, produces a reference clock on the basis of the extracted time information, and multiplexes the video data, the audio data, and the digital data which are extracted from object data except the specified object data using the reference clock to produce corrected object data.

According to a third aspect of the present invention, the multiplexed data producing apparatus according to the first aspect wherein the control means uses time information of specified object data of the N pieces of object data as a reference, and performs control so as to produce synchronization control data including absolute time information and time precision information on the basis of a difference between time information of object data except the specified object data of the N pieces of object data and the reference time information.

According to a fourth aspect of the present invention, the multiplexed data producing apparatus according to the third aspect wherein the control means performs control so as to produce priority information indicating that the reference clock is obtained on the basis of time information of object data of the N pieces of object data in the order of priorities when the produced multiplexed data is decoded.

According to a fifth aspect of the present invention, the multiplexed data producing apparatus according to the first aspect wherein the control means uses time information of specified object data of the N pieces of object data as a reference and performs control so as to change a multiplexing interval of object data except the specified object data of the N pieces of object data in accordance with the reference time information.

According to a sixth aspect of the present invention, the multiplexed data producing apparatus according to the fifth aspect wherein the control means controls change of the multiplexing interval by one of inserting null data and deserting the null data.

According to a seventh aspect of the present invention, the multiplexing data producing apparatus according to the first aspect wherein the control means uses time information of specified object data of the N pieces of object data as a reference and performs control so as to renew time information of object data except the specified object data of the N pieces of object data into the reference time information.

According to an eighth aspect of the present invention, the multiplexing data producing apparatus according to the seventh aspect wherein the control means performs control so as to add a special reproduction flag for correcting a difference in time precision between object data except the specified object data of the N pieces of object data and the specified object data.

According to a ninth aspect of the present invention, an encoded data reproducing apparatus which decodes and reproduces multiplexed data in which one of video data, audio data, and digital data is multiplexed comprises a demultiplexing means for extracting required data from the multiplexed data; a decoding means for decoding the extracted data; and a control means for controlling the decoding so that the multiplexed data can be synchronized and reproduced. Therefore it is possible to produce multiplexed data with no reproduction troubles.

According to a tenth aspect of the present invention, an encoded data reproducing apparatus processes multiplexed data which is produced in the multiplexed data producing apparatus according to any of the first to tenth aspect, thereby the multiplexed data which is produced in the multiplexed data producing apparatus according to the first aspect can be reproduced with no troubles in reproduction.

According to a 11th aspect of the present invention, the encoded data reproducing apparatus according to a ninth aspect wherein the control means performs control so as to use video data included in specified object data of N pieces of object data multiplexed into the multiplexed data as a background of an image to be reproduced, and to use time information of the specified object data as a reference clock of the encoded data reproducing apparatus.

According to a 12th aspect of the present invention, an encoded data reproducing apparatus which decodes and reproduces multiplexed data in which one of video data, audio data, and digital data is multiplexed, and inputs multiplexed data which is produced in the multiplexed data producing apparatus according to the fourth aspect comprises a demultiplexing means for extracting required data from the multiplexed data; a decoding means for decoding the extracted data; and a control means for controlling the decoding so that the multiplexed data can be synchronized and reproduced by setting a reference clock of the encoded data reproducing apparatus in accordance with the priority.

According to a 13th aspect of the present invention, an encoded data recording medium which records one piece of multiplexed data in which N pieces of object data is multiplexed, each of the N pieces of object data including one of video data, audio data, and digital data which has been multiplexed, is for recording multiplexed data in which time information of the N pieces of object data is synchronized. Therefore, multiplexed data can be stored with no troubles in reproduction.

According to a 14th aspect of the present invention, an encoded data recording medium records multiplexed data which is produced in the multiplexed data producing apparatus according to the first aspect in the encoded data recording medium according to the 13th aspect.

According to a 15th aspect of the present invention, an encoded data transmission medium which transmits one piece of multiplexed data in which N pieces of object data is multiplexed, each of the N pieces of object data including one of video data, audio data, and digital data which has been multiplexed, is for transmitting multiplexed data in which time information of the N pieces of object data is synchronized. Therefore, multiplexed data with no troubles in reproduction can be transmitted.

According to a 16th aspect of the present invention, an encoded data transmission medium which transmits multiplexed data which is produced in the multiplexed data producing apparatus according to the first aspect.

According to a 17th aspect of the present invention, there is provided an encoded data reproducing apparatus for decoding encoded digital data in which one of video data, audio data, and text data is compressively encoded, to reproduce one of video, audio, and text, and the apparatus comprises: storage means for storing N pieces of encoded digital data each including clock information of an encoding apparatus used for the compressive encoding; decoding means for decoding the encoded digital data; and control means for controlling the storage means and the decoding means so that the encoded digital data stored in the storage means are read out using a clock of this encoded data reproducing apparatus and then decoded. Therefore, trouble caused by lack of clock synchronization at reproduction of multiplexed data having different time bases is avoided, resulting in satisfactory reproduction.

According to an 18th aspect of the present invention, there is provided an encoded data reproducing apparatus for decoding encoded digital data in which one of video data, audio data, and text data is compressively encoded, to reproduce one of video, audio, and text, and the apparatus comprises: storage means for storing N pieces of encoded digital data each including clock information of an encoding apparatus used for the compressive encoding, except specified encoded digital data; decoding means for decoding the encoded digital data; and control means for controlling the decoding so that a synchronized clock of this encoded data reproducing apparatus is generated according to the clock information included in the specified encoded digital data, and the encoded digital data stored in the storage means are read out using a clock of this encoded data reproducing apparatus. Therefore, trouble caused by lack of clock synchronization at reproduction of multiplexed data having different time bases is avoided, resulting in satisfactory reproduction.

According to a 19th aspect of the present invention, there is provided an encoded data reproducing apparatus for decoding encoded digital data in which one of video data, audio data, and text data is compressively encoded, to reproduce one of video, audio, and text, and the apparatus comprises: storage means for storing N pieces of encoded digital data each including clock information of an encoding apparatus used for the compressive encoding; and decoding means for reading the encoded digital data stored in the storage means using a clock of this encoded data reproducing apparatus and then decoding the read data. Therefore, trouble caused by lack of clock synchronization at reproduction of multiplexed data having different time bases is avoided, resulting in satisfactory reproduction.

According to a 20th aspect of the present invention, there is provided a clock conversion apparatus for converting clock information possessed by encoded digital data in which one of video data, audio data, and text data is compressively encoded, and the apparatus comprises: storage means for storing N pieces of encoded digital data each including clock information of an encoding apparatus used for the compressive encoding; and clock conversion means for renewing the clock information of the encoded digital data stored in the storage means, using a clock of this clock conversion apparatus. Therefore, trouble caused by lack of clock synchronization at reproduction of multiplexed data having different time bases is avoided.

According to a 21st aspect of the present invention, there is provided a clock conversion apparatus for converting clock information possessed by encoded digital data in which one of video data, audio data, and text data are compressively encoded, and the apparatus comprises: storage means for storing N pieces of encoded digital data each including clock information of an encoding apparatus used for the compressive encoding; and clock conversion means for reading the encoded digital data stored in the storage means using a clock of this clock conversion apparatus, and deleting the clock information of the encoded digital data other than specified encoded digital data. Therefore, trouble caused by lack of clock synchronization at reproduction of multiplexed data having different time bases is avoided.

According to a 22nd aspect of the present invention, in the clock conversion apparatus according to the 20th aspect, employed as a clock of this clock conversion apparatus is a clock which is not synchronized with any of the clock information of the N pieces of encoded digital data.

According to a 23rd aspect of the present invention, in the clock conversion apparatus according to the 21st aspect, employed as a clock of this clock conversion apparatus is a clock which is not synchronized with any of the clock information of the N pieces of encoded digital data.

According to a 24th aspect of the present invention, in the clock conversion apparatus according to the 20th aspect, employed as a clock of this clock conversion apparatus is a clock which is synchronized with at least one of the clock information of the N pieces of encoded digital data.

According to a 25th aspect of the present invention, in the clock conversion apparatus according to the 21st aspect, employed as a clock of this clock conversion apparatus is a clock which is synchronized with at least one of the clock information of the N pieces of encoded digital data.

According to a 26th aspect of the present invention, in the clock conversion apparatus according to the 20th aspect, the N pieces of encoded digital data are multiplexed and then output.

According to a 27th aspect of the present invention, in the clock conversion apparatus according to the 21st aspect, the N pieces of encoded digital data are multiplexed and then output.

According to a 28th aspect of the present invention, there is provided an encoded data reproducing apparatus for decoding encoded digital data in which one of video data, audio data, and text data is compressively encoded, to reproduce one of video, audio, and text, wherein encoded digital data processed in the clock conversion apparatus according to the 20th aspect is employed as the decoding target, and the same clock is used for the decoding. Therefore, satisfactory reproduction without trouble is realized.

According to a 29th aspect of the present invention, there is provided an encoded data reproducing apparatus for decoding encoded digital data in which one of video data, audio data, and text data is compressively encoded, to reproduce one of video, audio, and text, wherein encoded digital data processed in the clock conversion apparatus according to the 21st aspect is employed as the decoding target, and the same clock is used for the decoding. Therefore, satisfactory reproduction without trouble is realized.

According to a 30th aspect of the present invention, there is provided an encoded data recording medium in which encoded digital data obtained by compressive encoding of one of video data, audio data, and text data is recorded, wherein encoded digital data processed in the clock conversion apparatus according to the 20th aspect is recorded. Therefore, encoded digital data capable of avoiding reproduction trouble can be stored and utilized.

According to a 31st aspect of the present invention, there is provided an encoded data recording medium in which encoded digital data obtained by compressive encoding of one of video data, audio data, and text data is recorded, wherein encoded digital data processed in the clock conversion apparatus according to the 21st aspect is recorded. Therefore, encoded digital data capable of avoiding reproduction trouble can be stored and utilized.

According to a 32nd aspect of the present invention, there is provided an encoded data transmitting medium in which encoded digital data obtained by compressive encoding of one of video data, audio data, and text data is transmitted, wherein encoded digital data processed in the clock conversion apparatus according to the 20th aspect is transmitted. Therefore, encoded digital data capable of avoiding reproduction trouble can be transmitted and utilized.

According to a 33rd aspect of the present invention, there is provided an encoded data transmitting medium in which encoded digital data obtained by compressive encoding of one of video data, audio data, and text data is transmitted, wherein encoded digital data processed in the clock conversion apparatus according to the 21st aspect is transmitted. Therefore, encoded digital data capable of avoiding reproduction trouble can be transmitted and utilized.

According to a 34th aspect of the present invention, a method of producing multiplexed data for multiplexing N (N: integer) pieces of object data in which one of video data, audio data, and digital data is multiplexed, to produce one piece of multiplexed data comprises temporarily storing the N pieces of object data; synchronizing time information of each object data for each temporarily stored object data; and multiplexing the processed object data to produce multiplexed data. Therefore, in the case of encoding objects using their respective encoding apparatus, it is possible to produce multiplexed data with no troubles in reproduction due to lack of synchronization.

According to a 35th aspect of the present invention, the method of producing multiplexed data according to the 34th aspect further comprises extracting time information of specified object data of the N pieces of object data; extracting the video data, the audio data, and the digital data or object data except the specified object data of the N pieces of object data; producing a reference clock on the basis of the extracted time information; and multiplexing the video data, the audio data, and the digital data which are extracted from object data except the specified object data to produce corrected object data using the reference clock.

According to a 36th aspect of the present invention, the method of producing multiplexed data according to the 34th aspect further comprises using time information of specified object data of the N pieces of object data as a reference and producing synchronization control data including absolute time information and time precision information on the basis of a difference between time information of object data except the specified object data of the N pieces of object data and the reference time information.

According to a 37th aspect of the present invention, the method of producing multiplexed data according to the 36th aspect further comprising producing priority information indicating that the reference clock is obtained on the basis of time information of object data of the N pieces of object data in the order of priorities when the produced multiplexed data is decoded.

According to a 38th aspect of the present invention, the method of producing multiplexed data according to the 34th aspect further comprises using time information of specified object data of the N pieces of object data as a reference and changing a multiplexing interval of object data except the specified object data of the N pieces of object data in accordance with the reference time information.

According to a 39th aspect of the present invention, the method of producing multiplexed data according to the 38th aspect wherein the multiplexing interval is changed by one of inserting null data and deserting null data.

According to a 40th aspect of the present invention, the method of producing multiplexed data according to the 34th aspect further comprises using time information of specified object data of the N pieces of object data and renewing time information of object data except the specified object data of the N pieces of object data into the reference time information.

According to a 41st aspect of the present invention, the method of producing multiplexed data according to the 40th aspect wherein a special reproduction flag for correcting a difference in time precision between object data except the specified object data of the N pieces of object data and the specified object data is added to the object data except the specified object data.

According to a 42nd aspect of the present invention, there is provided an encoded data reproducing method for decoding encoded digital data in which one of video data, audio data, and text data is compressively encoded, to reproduce one of video, audio, and text, and the method comprises: storing N pieces of encoded digital data each including clock information of an encoding apparatus used for the compressive encoding; and controlling the decoding so that the encoded digital data stored are read out using a clock of this encoded data reproducing method and then decoded. Therefore, trouble caused by lack of clock synchronization at reproduction of multiplexed data having different time bases is avoided, resulting in satisfactory reproduction.

According to a 43rd aspect of the present invention, there is provided an encoded data reproducing method for decoding encoded digital data in which one of video data, audio data, and text data is compressively encoded, to reproduce one of video, audio, and text, and the method comprises: storing N pieces of encoded digital data each including clock information of an encoding apparatus used for the compressive encoding, except specified encoded digital data; generating a synchronized clock of this encoded data reproducing method according to the clock information included in the specified encoded digital data; and reading the stored encoded digital data using the clock of this encoded data reproducing method and then decoding the data. Therefore, trouble caused by lack of clock synchronization at reproduction of multiplexed data having different time bases is avoided, resulting in satisfactory reproduction.

According to a 44th aspect of the present invention, there is provided an encoded data reproducing method for decoding encoded digital data in which one of video data, audio data, and text data is compressively encoded, to reproduce one of video, audio, and text, and the method comprises: storing N pieces of encoded digital data each including clock information of an encoding apparatus used for the compressive encoding; and reading the stored encoded digital data using a clock of this encoded data reproducing method and then decoding the data. Therefore, trouble caused by lack of clock synchronization at reproduction of multiplexed data having different time bases is avoided, resulting in satisfactory reproduction.

According to a 45th aspect of the present invention, there is provided a clock conversion method for converting clock information possessed by encoded digital data in which one of video data, audio data, and text data is compressively encoded, and the method comprises: storing N pieces of encoded digital data each including clock information of an encoding apparatus used for the compressive encoding; and renewing the clock information of the stored encoded digital data using a clock of this clock conversion method. Therefore, trouble caused by lack of clock synchronization at reproduction of multiplexed data having different time bases is avoided.

According to a 46th aspect of the present invention, there is provided a clock conversion method for converting clock information possessed by encoded digital data in which one of video data, audio data, and text data are compressively encoded, and the method comprises: storing N pieces of encoded digital data each including clock information of an encoding method used for the compressive encoding; and reading the stored encoded digital data using a clock of this clock conversion method, and deleting the clock information of the encoded digital data other than specified encoded digital data. Therefore, trouble caused by lack of clock synchronization at reproduction of multiplexed data having different time bases is avoided.

According to a 47th aspect of the present invention, in the clock conversion method according to the 45th aspect, employed as a clock of this clock conversion method is a clock which is not synchronized with any of the clock information of the N pieces of encoded digital data.

According to a 48th aspect of the present invention, in the clock conversion method according to the 46th aspect, employed as a clock of this clock conversion method is a clock which is not synchronized with any of the clock information of the N pieces of encoded digital data.

According to a 49th aspect of the present invention, in the clock conversion method according to the 45th aspect, employed as a clock of this clock conversion method is a clock which is synchronized with at least one of the clock information of the N pieces of encoded digital data.

According to a 50th aspect of the present invention, in the clock conversion method according to the 46th aspect, employed as a clock of this clock conversion method is a clock which is synchronized with at least one of the clock information of the N pieces of encoded digital data.

According to a 51st aspect of the present invention, in the clock conversion method according to the 45th aspect, the N pieces of encoded digital data are multiplexed and then output.

According to a 52nd aspect of the present invention, in the clock conversion method according to the 46th aspect, the N pieces of encoded digital data are multiplexed and then output.

According to a 53rd aspect of the present invention, there is provided an encoded data reproducing method for decoding encoded digital data in which one of video data, audio data, and text data is compressively encoded, to reproduce one of video, audio, and text, wherein encoded digital data processed in the clock conversion method according to the 45th aspect is employed as the decoding target, and the same clock is used for the decoding. Therefore, satisfactory reproduction without trouble is realized.

According to a 54th aspect of the present invention, there is provided an encoded data reproducing method for decoding encoded digital data in which one of video data, audio data, and text data is compressively encoded, to reproduce one of video, audio, and text, wherein encoded digital data processed in the clock conversion method according to the 46th aspect is employed as the decoding target, and the same clock is used for the decoding. Therefore, satisfactory reproduction without trouble is realized.

BRIEF DESCRIPTION OF THE DRAWINGS

FIG. 11 is a diagram for explaining input encoded data (multiplexed data) according to the fifth embodiment.

FIGS. 16(a) to 16(e) are diagrams for explaining clock conversion according to the seventh embodiment.

FIG. 24 is a diagram for explaining input encoded data (multiplexed data) to be processed by the encoded data reproducing apparatus.

DETAILED DESCRIPTION OF THE PREFERRED EMBODIMENTS

Embodiment 1

A multiplexed data producing apparatus according to a first embodiment of the present invention produces multiplexed data which can be synchronized and reproduced, by using a time base of a specified object as a time base of another object, thereby using plural pieces of object data of different time base.

Figure 1:
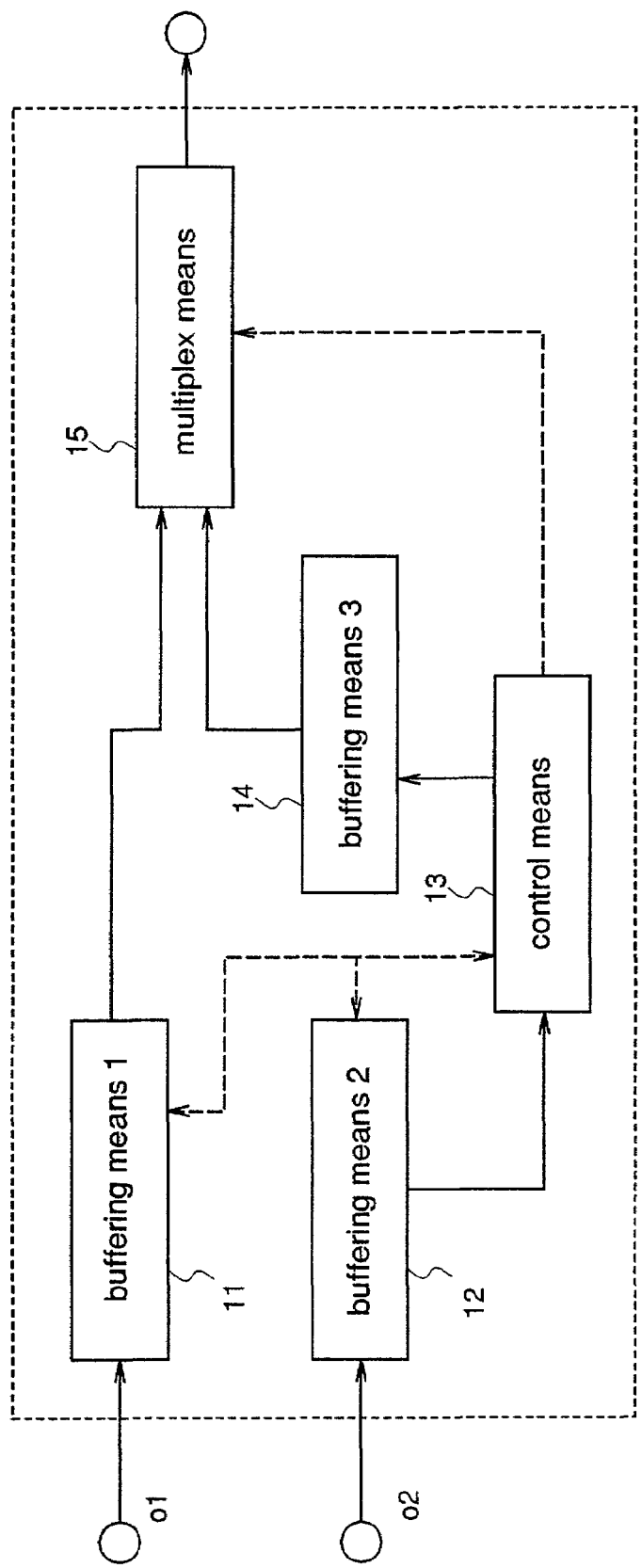
FIG. 1 is a block diagram illustrating a multiplexed data producing apparatus according to first to fourth embodiments of the present invention.

FIG. 1 is a block diagram illustrating the multiplexed data producing apparatus according to the first embodiment of the present invention. In the figure, a first buffering means 11 is for temporarily storing first object data. A second buffering means 12 is for temporarily storing second object date. A control means 13 is for controlling processing of object data stored temporarily. A third buffering means 14 is for processing object data. A multiplexing means 15 is for producing multiplexed data from processed object data.

Figure 2:
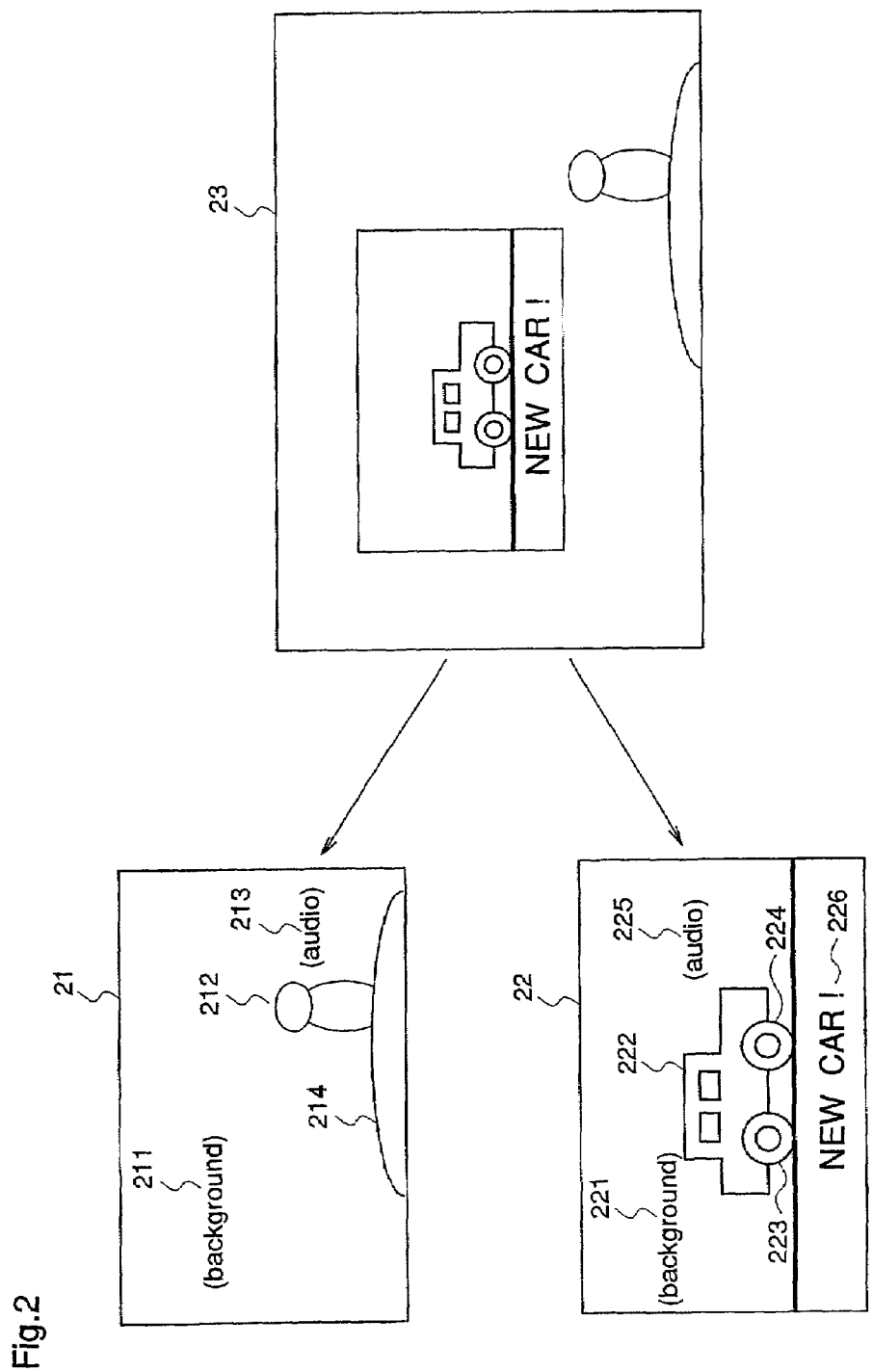
FIG. 2 is a diagram for explaining object encoding.

FIG. 2 illustrates object encoding and object data. In the object encoding method, encoding is performed for each object as shown in FIG. 2. A target to be encoded in FIG. 2 is an image 23 of a series of video data including objects 21 and 22. The object 21 includes a background 211, a character 212, an audio 213 and a table 214. The object 22 includes a background 221, a car body 222, wheels 223 and 224, a car audio 225 and character information 226. Minimum units of objects, namely, 211, 212, 213, 214, 221, 222, 223, 224, 225, and 226 are compressed and encoded, respectively.

In some cases, objects of high independence such as objects 21 and 22 constituting one target to be encoded (23) are encoded by different encoding apparatus. In that case, reference clocks of objects do not always match from each other. The reference clock includes an absolute time indicating a specific time and precision in clock which clocks the absolute time. It is possible to set a number of objects arbitrarily. Assume that N=2, that is, two objects are encoded herein.

Figure 3:
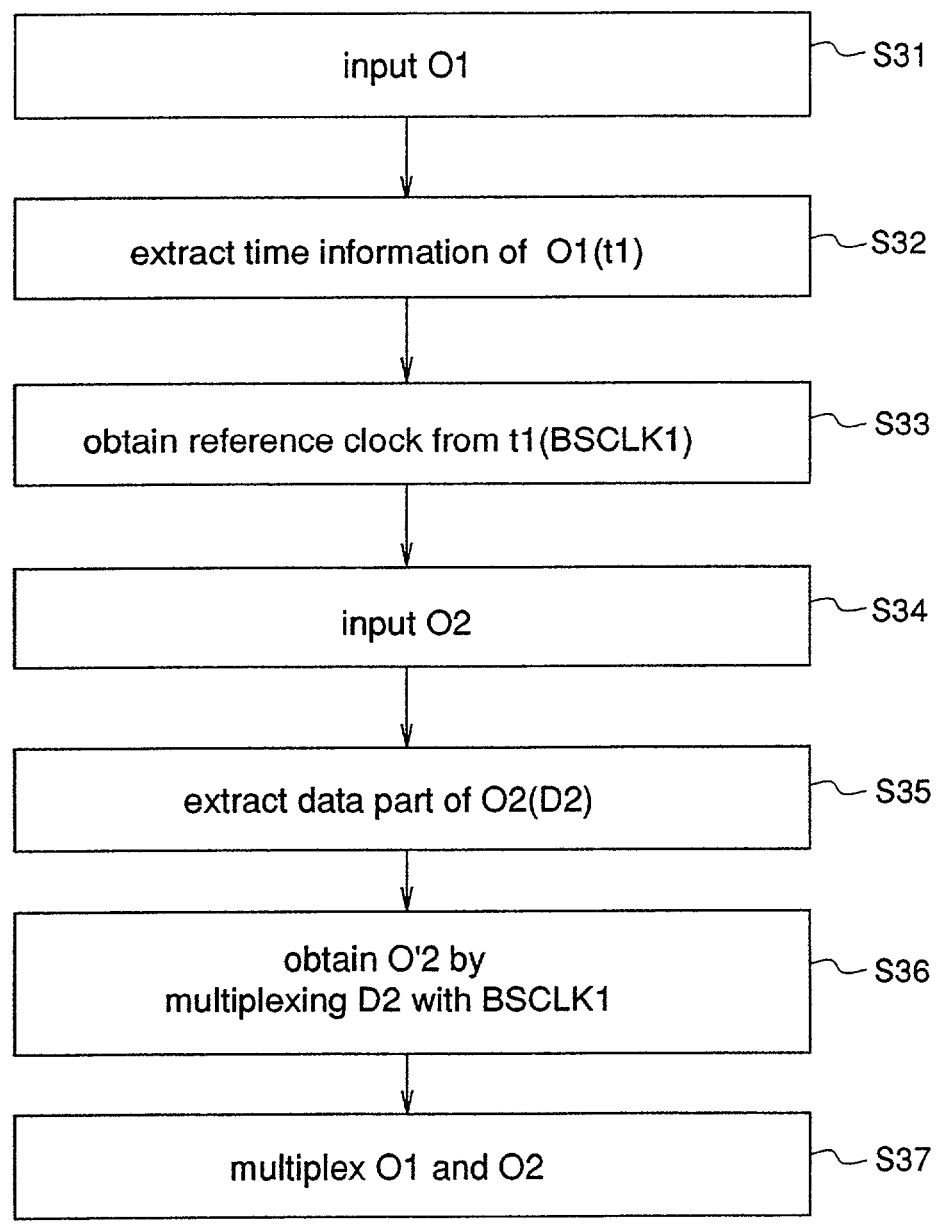
FIG. 3 is a flowchart illustrating processing procedure of producing multiplexed data according to the first embodiment.

FIG. 3 is a flowchart illustrating a processing procedure under control of the control means 13. A description is given of an operation of the multiplexed data producing apparatus according to the first embodiment with reference FIG. 3. Assume that two pieces of object data includes "01" and "02", respectively, which are obtained using respective time bases and reference clocks thereof are varied from each other. Also, assume that they have their respective time information. Time information includes decoding time stamp (hereinafter referred to as DTS) as time information as to decoding for synchronizing and reproducing video and audio, presentation time stamp (hereinafter referred to as PTS) as time information for display, and program clock reference (hereinafter referred to as PCR) as information as to time in the case of encoding video data or audio data, which have common time base.

In step 31 in FIG. 3, the first object data "01" is input to the apparatus and stored temporarily in the first buffering means 11. Subsequently in step 32, time information t1 including PCR, PTS and DTS is extracted from the temporarily stored object data "01". In step 33, reference clocks bsclk1 is obtained on the basis of the time information t1.

In step 34, the second object data "02" is input to the apparatus and stored temporarily in the second buffering means 12 as In step 31. In step 35, data part D2 except time information is extracted from the temporarily stored data "02". In step 36, the control means 13 multiplexes the data part D2 of the object data "02" obtained in step 35 and the reference clocks bsclk1 obtained in step 33, thereby producing data "0'2" of the same reference clock as the object data "01" and outputting the data "0'2" to a third buffering means 14.

In step 37, the multiplexing means 15 obtains "01" from the first buffering means 11 and "0'2" from the third buffering means 14 to produce multiplexed data from "01" and "0'2" and outputs the multiplexed data as an output of the multiplexed data producing apparatus according to the first embodiment. The multiplexed data includes two pieces of object data of the same reference clock.

Figure 4:
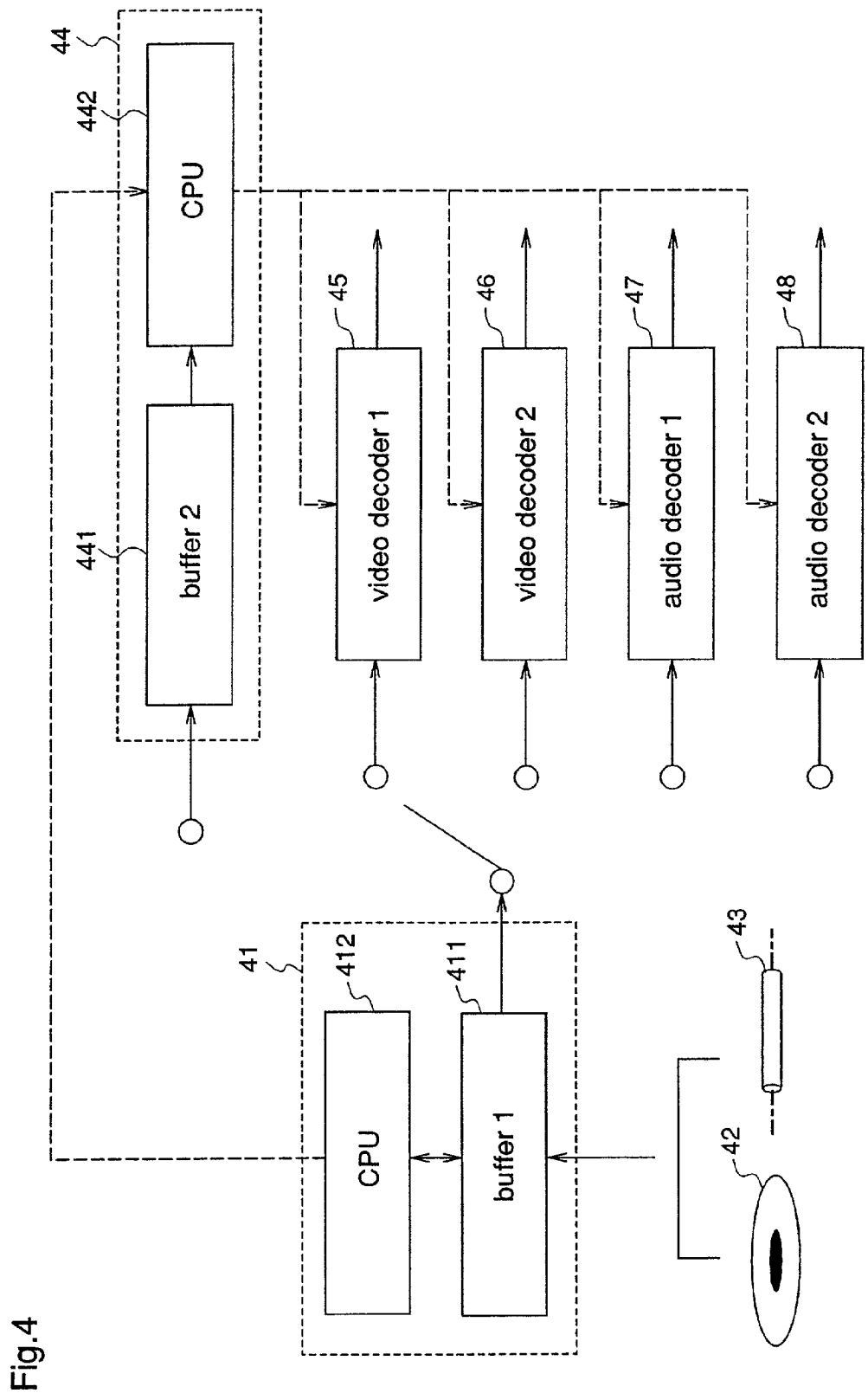
FIG. 4 is a block diagram illustrating the multiplexed data reproducing apparatus according to the first embodiment.
Figure 5:
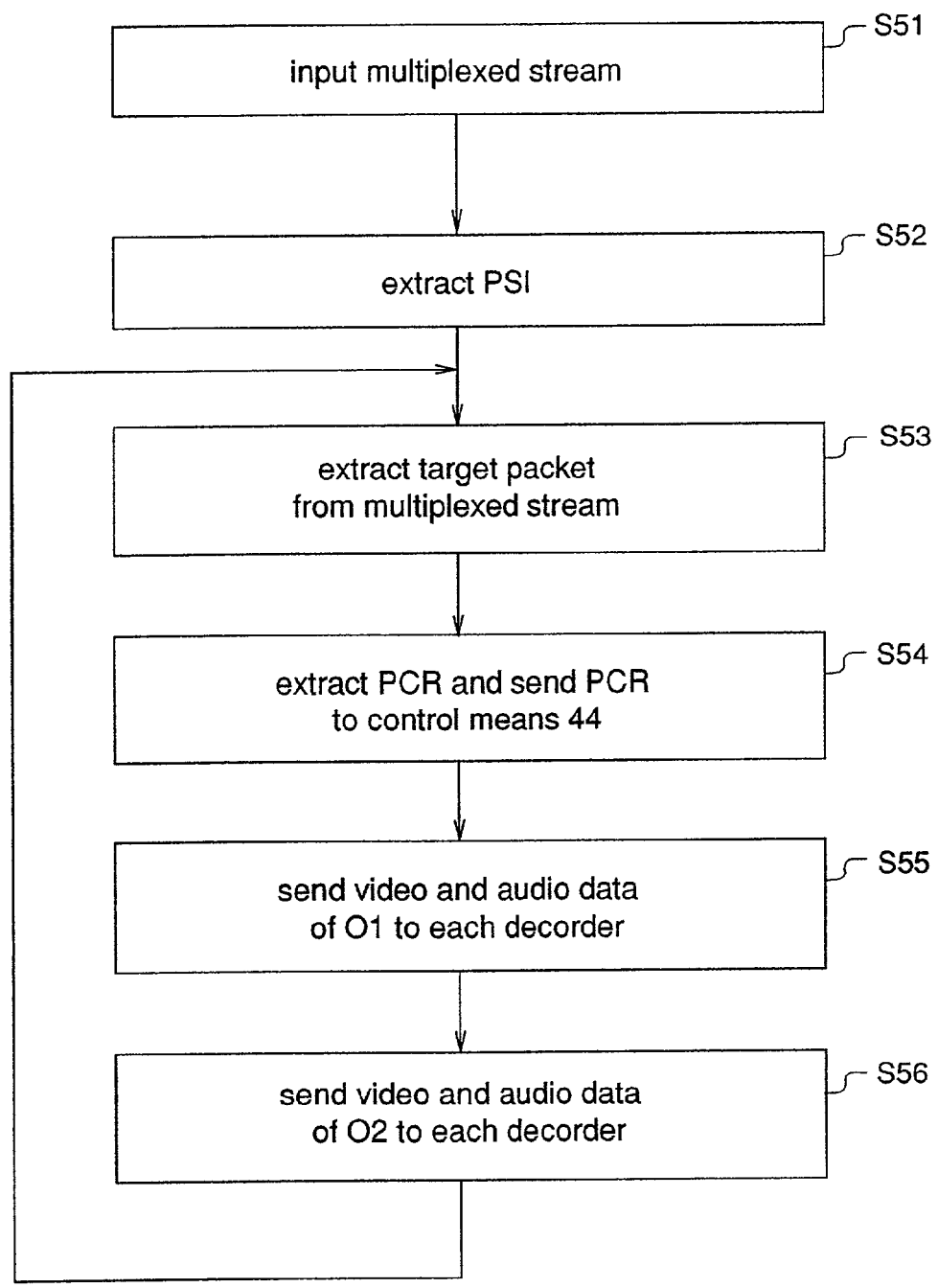
FIG. 5 is a flowchart illustrating a processing procedure of demultiplexing of the multiplexed data reproducing apparatus according to the first embodiment.

A description is given of the multiplexed data reproducing apparatus according to the first embodiment which decodes and reproduces thus produced multiplexed data. FIG. 4 is a block diagram illustrating the multiplexed data reproducing apparatus according to the first embodiment. In the figure, a demultiplexing means 41 including a first buffer 411 and CPU 412 is for separating and extracting required data from input multiplexed data. A control means 44 including a second buffer 441 and CPU 442 is for controlling decoding of video data, audio data or the like. A first video decoder 45 and a second video decoder 46 are for decoding encoded video data. A first audio decoder 47 and a second audio decoder 48 are for decoding encoded audio data. FIG. 5 is a flow chart illustrating a processing procedure of the demultiplexing means 41 and FIG. 6 is a flowchart illustrating a processing procedure of decoding under control of the control means 46.

Figure 6:
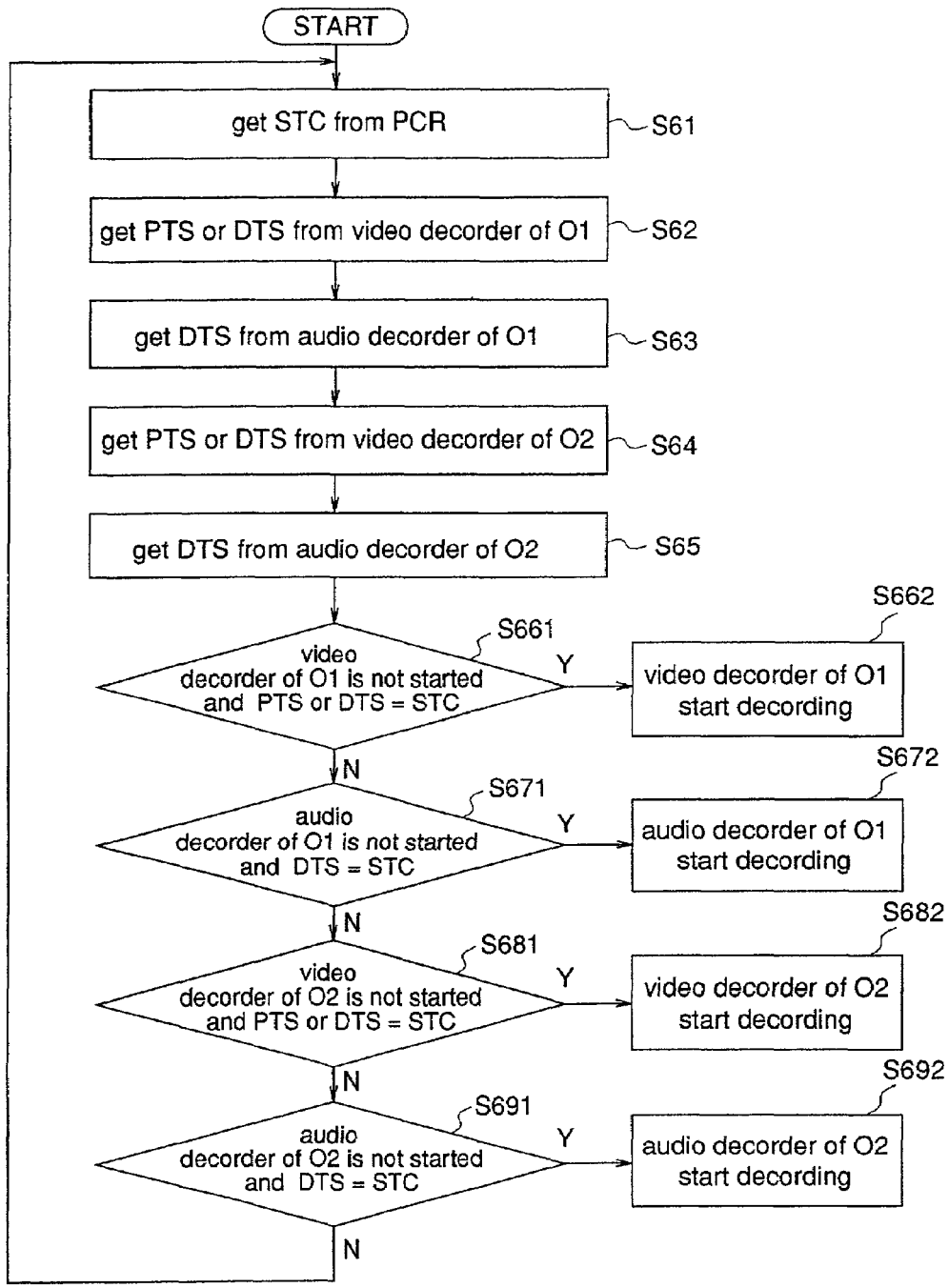
FIG. 6 is a flowchart illustrating a processing procedure of decoding control of the multiplexed data reproducing apparatus according to the first embodiment.

A description is given of an operation of the multiplexed data reproducing apparatus according to the first embodiment with reference to FIG. 4, and simultaneously following flow in FIG. 5 and FIG. 6. In step 51 in FIG. 5, thus produced multiplexed data is input to the reproducing apparatus according to the first embodiment through the recording medium 42 or the transmission medium 43 and stored temporarily in the first buffer 411. In step 52, PSI is extracted from the temporarily multiplexed data. This makes it possible to find a correspondence between a program and PID of various data and obtain required data of a desired program.

In step 53, in the demultiplexing means 41, a packet including PCR, video data and audio data for the desired program is fetched. The fetched packet is output to the control means 44 or one of the decoders 45 to 48 in steps subsequent to step 54. In step 54, PCR is extracted and output to the control means 44, to be used for control of decoding.

In step 55, video data and audio data of the object data "01" are output to the first video decoder 45 and the first audio decoder 47, respectively. Similarly in step 56, video data and audio data of the object data "02" are output to the second video decoder 46 and the second audio decoder 48, respectively. Only video data and audio data are handled herein. In case where multiplexed data includes digital data except video and audio data, the digital data is output to the control means 44 and processed therein.

A description is given of decoding each data under control of the control means 44, following a flow in FIG. 6. In step 61, the control means 44 obtains system time information (hereinafter STC) as a time base of the data reproducing apparatus on the basis of the obtained PCR. In step 62, the control means 44 controls the first video decoder 45 and obtains PTS or DTS from the video data of "01". Similarly in step 63, the control means 44 controls the first audio decoder 47 and obtains DTS from audio data of "01". Steps 64 and 65 are performed for "02" as in steps 62 and 63. As a result, decoding in steps subsequent to steps 661 can be controlled.

In step 661, the control means 44 decides whether a video decoder for "01", i.e., the first video decoder 45 has started decoding of video data or not. In addition, the control means 44 decides whether PTS or DTS obtained in step 62 matches STC obtained in step 61 or not. When it is decided that the first video decoder 45 has not started processing of video data and PTS or DTS matches STC, step 662 is performed and the first video decoder 45 starts decoding of video data of input "01".

In step 671, the control means 44 decides whether an audio decoder for "01", i.e., the first audio decoder 47 has started decoding of audio data or not. In addition the control means 44 decides whether DTS obtained in step 63 matches STC obtained in step 61. When it is decided that the first audio decoder 47 has not started processing of audio data and DTS matches STC, step 672 is performed and the first audio decoder 47 starts decoding of audio data of input "01".

Decision processing in step 681 and 691 are performed as in steps 661 and 671. When step 682 or step 692 is performed on the basis of the decision result in these steps, decoding of the video data or audio data of "02" is started.

Thus, the multiplexed data producing apparatus according to the first embodiment comprises the first to third buffering means 11, 12, and 14, the control means 13 and the multiplexing means 15, so that when multiplexed data is produced from a plurality of objects, a reference clock of a specified object is obtained and the other objects are multiplexed on the basis of the reference clock of the specified object using residual data except time information. Therefore, one reference clock is employed for respective reference clocks of objects and multiplexed data can be produced with objects synchronized.

The multiplexed data reproducing apparatus according to the first embodiment comprises the demultiplexing means 41, the control means 44, video and audio decoders 45 to 48, for comparing time information included in video data or audio data with the time base of the reproducing apparatus to make a decision, and then decoding is performed. As a result, reproduction and display can be performed with synchronization of objects maintained.

Having thus illustrated only handling of two object data, multiplexed data can be produced and reproduced for object data of an arbitrary number.

In addition, processing procedures shown in FIGS. 3, 5, and 6 are only illustrative. For example, in step 661 in FIG. 6, "PTS or DTS=STC", i.e., "match or no match" is employed as a decision condition. Alternatively, "PTS or DTS≧STC" may be employed to perform the same processing.

Further, as concerns specifying an object, for example, selection can be performed in such a way that object data including a video used as a background is used as a reference.

Embodiment 2

A multiplexed data producing apparatus according to a second embodiment of the present invention produces multiplexed data which can be synchronized and reproduced by giving synchronization control data.

Figure 7:
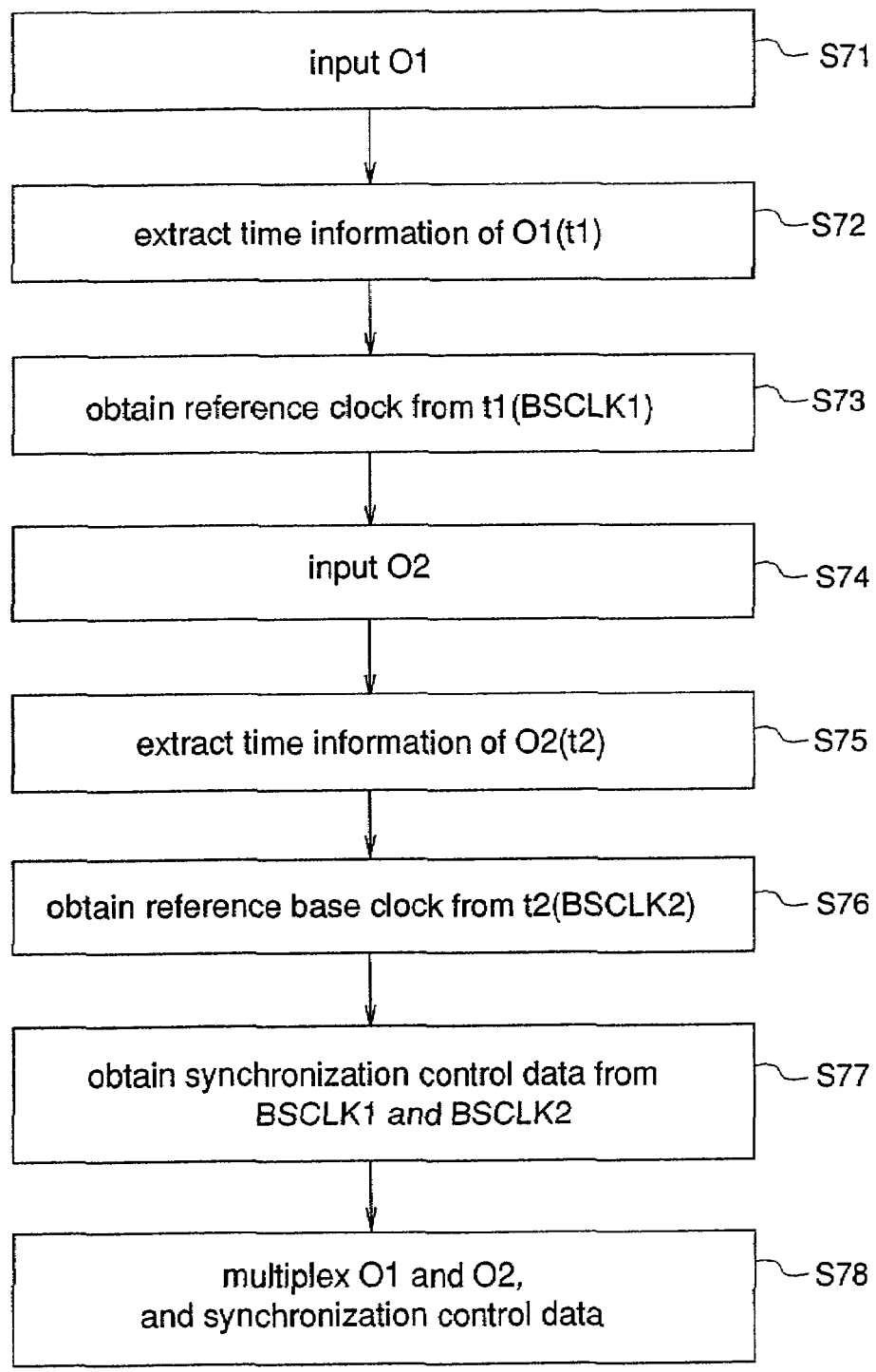
FIG. 7 is a flow chart illustrating a processing procedure of producing multiplexed data according to a second embodiment of the present invention.

A construction of the multiplexed data producing apparatus according to the second embodiments is identical to that of the apparatus according to the first embodiment. A description thereof is given with reference to FIG. 1. In the producing apparatus according to the second embodiment, a processing procedure of control of the control means 13 is different from that of the first embodiment. FIG. 7 is a flow chart illustrating a processing procedure of the second embodiment.

A description is given of an operation of the multiplexed data producing apparatus according to the second embodiment with reference to FIG. 1 and following a flow in FIG. 7. In step 71, object data "01" is input to the apparatus and stored temporarily in a first buffering means 11. In step 72, the control means 13 extracts time information t1 from the temporarily stored "01". In step 73, the control means 13 obtains a reference clock bsclk1 from t1. Steps 74 to 76 are performed as in steps 71 to 73 and a reference clock bsclk2 is obtained.

As Should be appreciated from foregoing description, a reference clock includes an absolute time and clock precision. In step 77, the control means 13 computes a difference in absolute time and a difference in clock precision between the reference clocks bsclk1 and bsclk2. The difference in absolute time and the difference in clock precision are output to a third buffering means 14 as synchronization control data together with data "02". In step 78, the multiplexing means 15 multiplexes "01", "02" and the synchronization control data using bsclk1 and outputs the resulting data as an output of the multiplexed data producing apparatus according to the second embodiment.

A construction of the multiplexed data reproducing apparatus according to the second embodiment is identical to that of the reproducing apparatus according to the first embodiment. A description is given of the reproducing apparatus with reference to FIG. 4. A reproducing operation of multiplexed data in the reproducing apparatus according to the second embodiment is different from that of the apparatus according to the first embodiment in the following respects and is identical to that in the other respects.

An operation of the multiplexed data reproducing apparatus according to the second embodiment is different from that of the multiplexed data reproducing apparatus according to the first embodiment in that synchronization control data is extracted in the demultiplexing means 41 and output to the control means 44. In the control means 44, a difference in absolute time and a difference in clock precision are extracted from the synchronization control data. The control means 44 executes control so as to offset decoding timing of each decoder for video data and audio data of "02" using the extracted difference in absolute time. In addition, the control means 44 executes control so as to correct asynchronization, by computing ratio of asynchronization of objects with a lapse of reproduction time on the basis of the difference in clock precision extracted from the synchronization control data and by performing special reproduction.

Thus, with the construction of the multiplexed data producing apparatus according to the second embodiment, which is identical to that of the first embodiment, the synchronization control data including the difference in absolute time and the difference in clock precision between clocks and multiplexed data including the synchronization control data is produced on the basis of the reference clocks of plural pieces of object data for use in multiplexing. Therefore, preferable synchronization and reproduction can be performed in the reproducing apparatus using the synchronization control data. In addition, control is executed using the synchronization control data included in the multiplexed data, thereby the multiplexed data can be synchronized and reproduced with high precision.

Although it is possible to obtain multiplexed data used in a general reproducing apparatus in producing multiplexed data according to the first embodiment, the producing apparatus requires buffers sufficient for processing object data, causing some burden in multiplexing processing. On the other hand, in the second embodiment, it is necessary to execute control using the synchronization control data in the reproducing apparatus and processing burden to the producing apparatus is reduced, compared with the producing apparatus in the first embodiment.

In the second embodiment, since multiplexing is performed using the reference clock bsclk1 of the specified object data "01", multiplexed data including only PCR synchronized with "01" is produced. In addition to this, it is possible to produce multiplexed data including PCR of different reference clocks. In this case, by assigning a priority to time information of object data to reproduce a reference clock and performing multiplexing, a reference clock is obtained and used in accordance with the priority. As a result, the reproducing apparatus can perform synchronization and reproduction with no reproduction troubles.

Furthermore, as in the first embodiment, the apparatus can handle digital data other than video data and audio data, and the apparatus may handle an arbitrary number of pieces of object data although multiplexed data on the basis of two pieces of object data has been described.

Embodiment 3

A multiplexed data producing apparatus according to a third embodiment of the present invention produces multiplexed data which can be synchronized and reproduced by changing a multiplexing interval.

Figure 8:
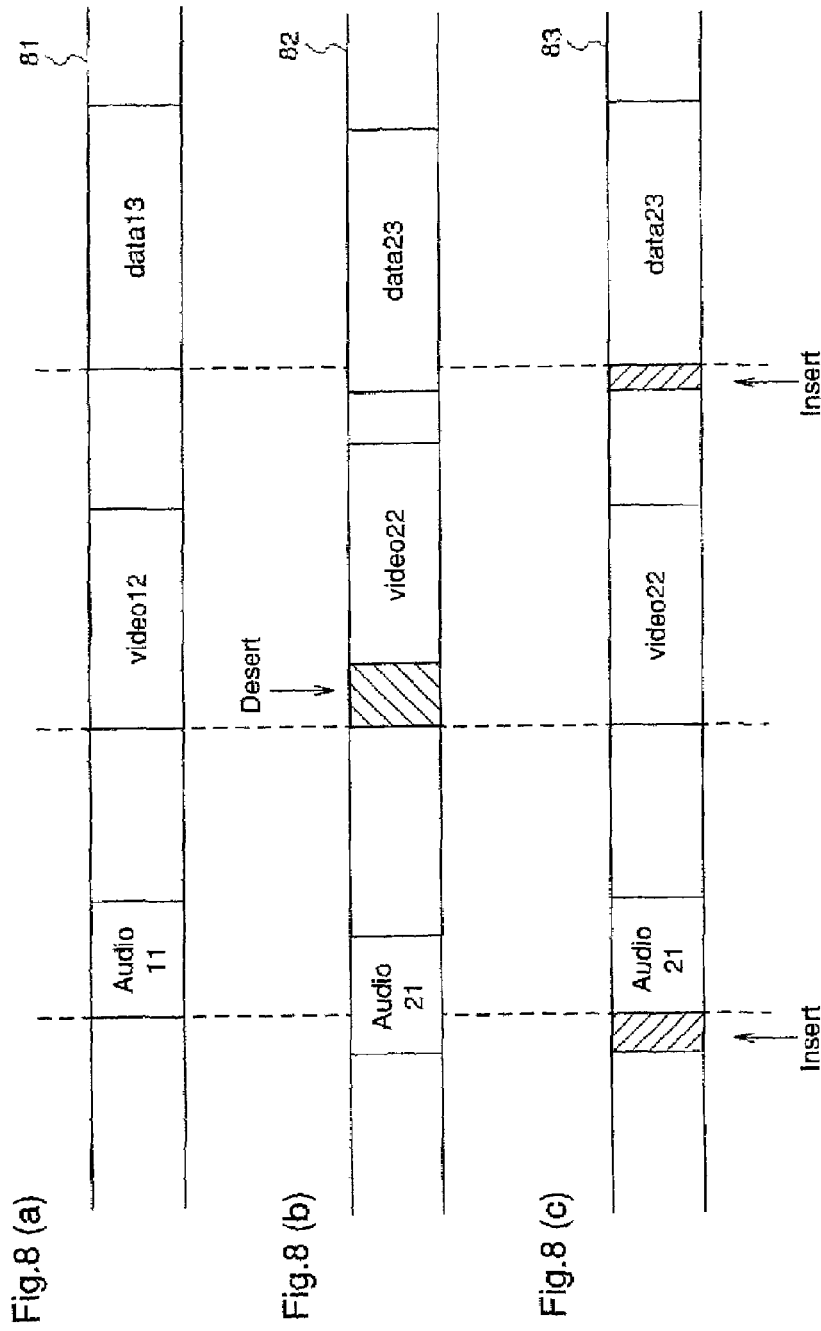
FIGS. 8(a) to 8(c) are diagrams for explaining production of multiplexed data according to a third embodiment of the present invention.

A construction of the multiplexed data producing apparatus according to the third embodiment is identical to that of the apparatus according to the first embodiment and will be described with reference to FIG. 1. The producing apparatus according to the third embodiment differs in a processing procedure of a control means 13 from those of the first and second embodiments. FIGS. 8(a) to 8(c) are diagrams for explaining changing processing of the multiplexing interval in the third embodiment. A description is given of an operation of the multiplexed data producing apparatus according to the third embodiment with reference to FIGS. 1 and 8(a) to 8(c).

In FIG. 1, two pieces of object data "01" and "02" with reference clocks varied from each other are input and stored temporarily in first and second buffering means 11 and 12, respectively. In FIGS. 8(a) to 8(c), assume that "01" and "02" are 81 in (a) and 82 in (b), respectively. Audio 11 and 21, video 12 and 22, and data 13 and 23 are digital data such as audio data, video data and character information, respectively and are to be synchronized and displayed, respectively. The object data 81 and 82 except the audio data, video data and digital data are null data, that is, data with low significance which is to be processed.

In the multiplexed data producing apparatus according to the third embodiment, the control means 13 changes a multiplexing interval of "02" using "01" as a reference and outputs the changed data to a third buffering means 14. The multiplexing interval is changed as follows. As shown in FIG. 8(c), until the audio data 11 of "01" as the reference arrives, data is inserted before Audio 21. As shown in FIG. 8(b), video 12 arrives and data before video 22 is deserted. Similarly as shown in FIG. 8(c), until data 13 arrives, data is inserted before data 23. As concerns deserting data, the null data may be deserted. Also, the null data may be employed as data to be inserted.

In this way, "02" with a multiplexing interval thereof changed becomes data "0'2" synchronized with "01". The multiplexing means 15 fetches data "01" from the first buffering means 11 and data "0'2" with the multiplexing interval thereof changed from the third buffering means 14, and multiplexes a difference in absolute time of reference clocks between "01" and "0'2" as synchronization control data, together with "01" and "0'2" and outputs resulting data as an output of the multiplexed data producing apparatus according to the third embodiment.

A construction of a multiplexed data reproducing apparatus according to the third embodiment is identical to that of the reproducing apparatus according to the first embodiment and a description is given with reference to FIG. 4. An operation of reproducing multiplexed data in the reproducing apparatus according to the third embodiment is identical to those in the apparatus according to the first and second embodiments except the following respects.

In the reproducing apparatus according to the third embodiment as in the reproducing apparatus according to the second embodiment, synchronization control data is output to the control means 44 from the demultiplexing means 41. The control means 44 extracts a difference in control time from the synchronization control data and executes control using the difference as in the second embodiment. Control using a difference in clock precision and special reproduction are dispensed with.

Thus, with the construction of the multiplexed data producing apparatus according to the third embodiment, which is identical to that of the apparatus according to the first embodiment, using a specified object data of plural pieces of object data for use in multiplexing as a reference, a multiplexing interval of the other object data is changed to be synchronized with the specified object data as the reference, thereby multiplexed data is produced, including the synchronization control data which includes a difference in absolute time between clocks. Therefore, it is possible to perform preferable synchronization and reproduction using the synchronization control data. In addition, control is performed using synchronization control data included in multiplexed data, thereby the multiplexed data can be synchronized and reproduced.

Using multiplexed data according to the third embodiment, since there is an effect of an error in changing the multiplexing interval, precision in synchronization is somewhat degraded, compared with that in the first or second embodiment. However, since clock precision is not taken into account, processing burden to the producing apparatus and the reproducing apparatus is not significant and capabilities of the apparatus or setting time information can provide appropriate synchronization and reproduction. It should be noted that setting must be performed in view of possibility of overflow or underflow in buffers of the reproducing apparatus resulting from changed multiplexing interval.

In the third embodiment, the multiplexing interval of "02" is changed using "01" as a reference. Alternatively, the multiplexing interval of "01" is changed using "02" as a reference and the same effects are attained.

In addition, an arbitrary number of pieces of object data may be processed as in the case of two pieces of object data as in the first and second embodiments.

Embodiment 4

A multiplexed data producing apparatus according to a fourth embodiment produces multiplexed data which can be synchronized and reproduced by using renewal of time information and a wait flag.

A construction of the multiplexed data producing apparatus according to the fourth embodiment is identical to that of the apparatus in the first embodiment and a description thereof is given with reference to FIG. 1. The producing apparatus according to the fourth embodiment differs in a processing procedure of a control means 13 from those in the first to third embodiments. FIGS. 9(a) to 9(e) are diagrams for explaining a processing in the fourth embodiment. A description is given of an operation of the multiplexed data producing apparatus according to the fourth embodiment with reference to FIG. 1 and FIGS. 9(a) to 9(e).

In FIG. 1, two pieces of object data "01" and "02" with reference clocks varied from each other are input and stored temporarily in first and second buffering means 11 and 12, respectively. In FIGS. 9(a) to 9(e), assume that "01" and "02" are 91 in (a) and 92 in (b), respectively. Audio 11 and 21, video 12 and 22, and data 13 and 23 are digital data such as audio data, video data and character information, respectively and are to be synchronized and displayed, respectively. Respective data includes DTS or PTS shown in FIGS. 9(a) to 9(e).

Figure 9:
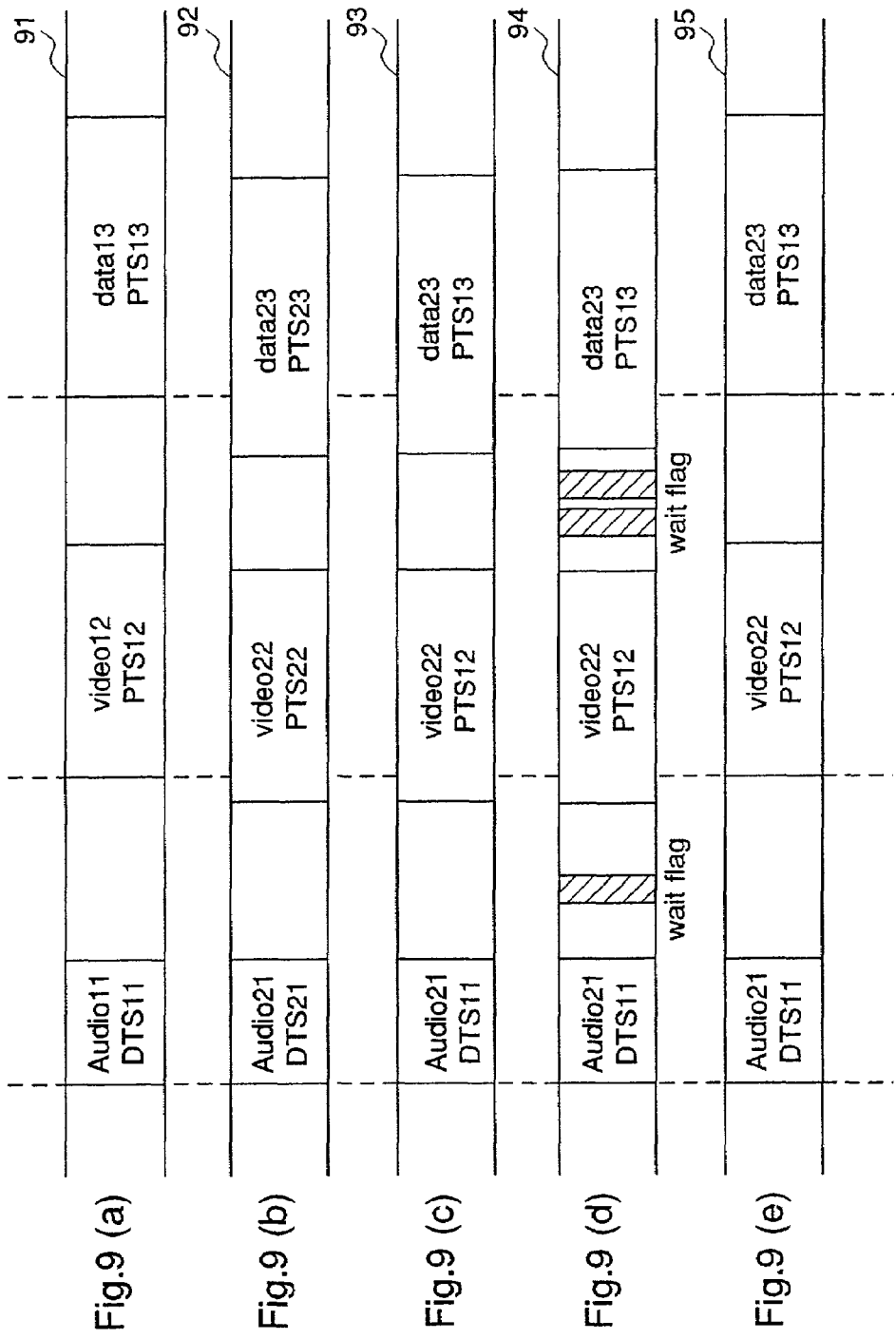
FIGS. 9(a) to 9(e) are diagrams for explaining production of multiplexed data according to a fourth embodiment of the present invention.

The control means extracts time information t1 from the temporarily stored "01". Then, the control means 13 renews time information of the temporarily stored "02" into t1. As shown in FIGS. 9(b) and 9(c), data 93 is obtained with DTS and PTS changed. As shown in FIGS. 9(a) and 9(c), an effect of a difference in precision in reference clocks between "01" and "02" is not eliminated, remaining as an error in synchronization. Therefore, the control means 13 adds a wait flag for stopping decoding for some time or delaying an output of decoded data to data 93 for multiplexing, thereby the data 93 is output to the third buffering means 14 in FIG. 1 as the data 94 ("0'2") in FIG. 9(d).

The multiplexing means 15 fetches the data "01" from the first buffering means 11 and the data "0'2" from the third buffering means 14 to multiplex the "01" and the "0'2" and outputs resulting multiplexed data as an output of the multiplexed data producing apparatus according to the fourth embodiment.

A construction of the multiplexed data reproducing apparatus according to the fourth embodiment is identical to that of the reproducing apparatus according to the first embodiment and will be described with reference to FIG. 4. An operation of reproducing multiplexed data in the reproducing apparatus according to the fourth embodiment is identical to that of the apparatus according to the first embodiment except the following respects.

The demultiplexing means 41 detects a wait flag of input data stored temporarily in the buffer 411. Upon detection of the wait flag, the demultiplexing means 41 outputs detection signals to the control means 44. On receipt of the detection signals, the control means 44 controls a decoder concerned of decoders 45 to 48 so that the decoder concerned stops decoding for some time or it delays outputting decoded data. Reference numeral 95 shown in FIG. 9(e) illustrates a reproduction result of data on the basis of "02". The wait flag multiplexed into data 94 in FIG. 9(d) is processed, thereby video 22 and data 23 are output with delay and synchronized with data shown in FIG. 9(a).

With the construction of the multiplexed data producing apparatus according to the fourth embodiment which is identical to that of the apparatus according to the first embodiment, a specified object data of plural pieces of object data for use in multiplexing is used as a reference, to renew time information of the other object data into time information of the reference object data, and the wait flag for delaying decoding is added to correct asynchronization due to a difference in clock precision, thereby multiplexed data is produced. Therefore, use of the wait flag in reproduction allows producing multiplexed data in the reproducing apparatus which can be synchronized and reproduced preferably. In addition, control is executed in accordance with the wait flag, thereby the multiplexed data can be reproduced preferably.

The multiplexed data producing apparatus according to the fourth embodiment bears burden in processing more than the apparatus according to the second embodiment, and bears burden less than the apparatus according to the first embodiment and can produce multiplexed data which can be synchronized and reproduced with almost the same precision. In some cases, since renewal of time information is not performed with ease when there is a large difference in encoding condition between plural pieces of object data, the producing apparatus is suitable for the case of handling object data under almost the same encoding condition

Embodiment 5

An encoded data reproducing apparatus according to a fifth embodiment of the present invention corrects asynchronization by temporarily storing data to be decoded in a memory.

Figure 10:
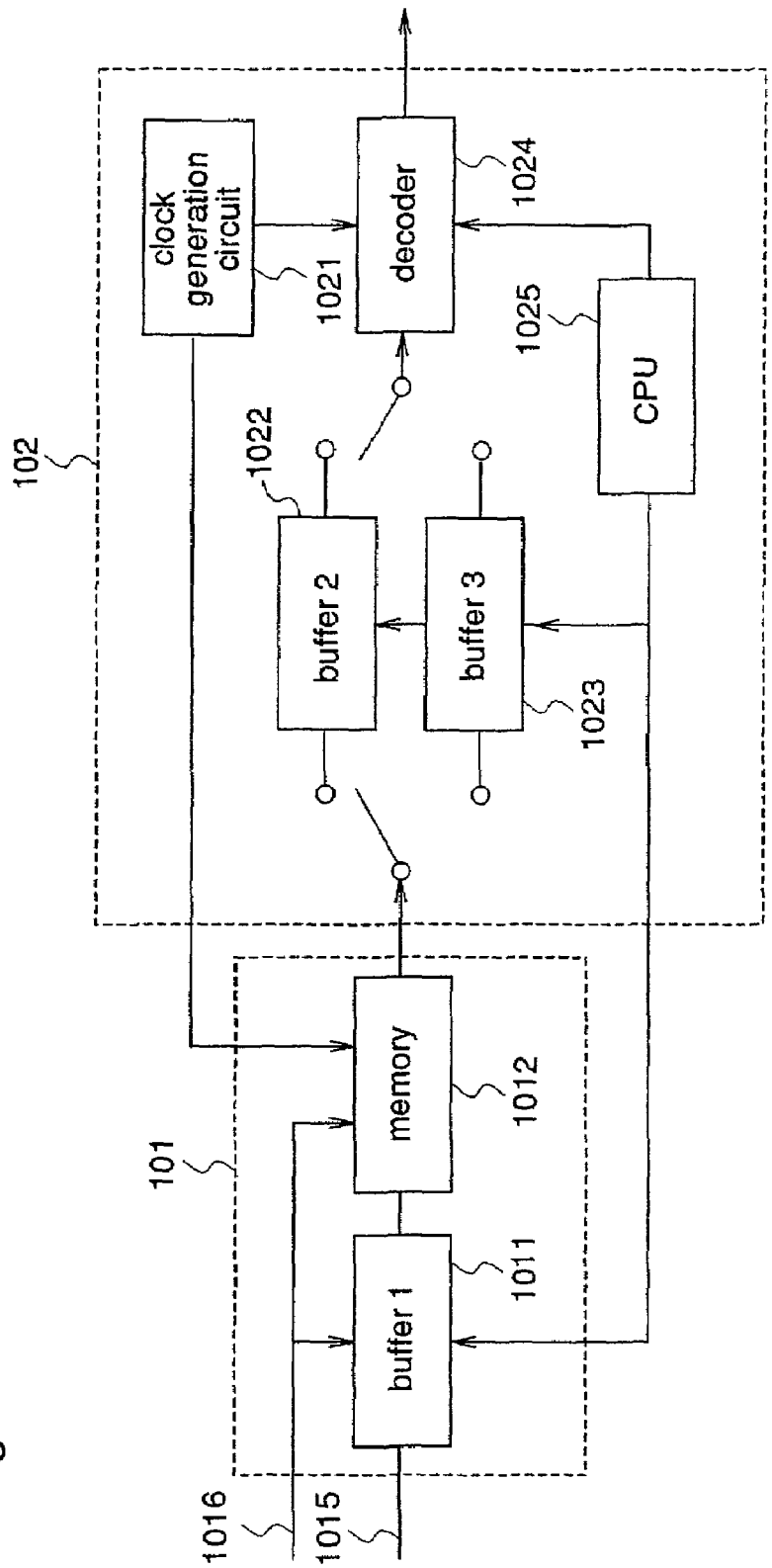
FIG. 10 is a block diagram illustrating an encoded data reproducing apparatus according to a fifth embodiment of the present invention.

FIG. 10 is a block diagram illustrating the structure of the encoded data reproducing apparatus according to the fifth embodiment. In the figure, reference numeral 101 designates a storage unit comprising a first buffer 1011 and a memory 1012. The first buffer 1011 temporarily stores input multiplexed data. The memory 1012 stores data to be decoded. Reference numeral 102 designates a decoding unit comprising a clock generation circuit 1021, a second buffer 1022, a third buffer 1023, a decoder 1024, and a CPU (Central Processing Unit) 25. The clock generation circuit 1021 generates a clock used for decoding. The second buffer 1022 temporarily stores first encoded digital data to be decoded. The third buffer 1023 temporarily stores second encoded digital data to be decoded. The decoder 1024 decodes and reproduces compressed image or audio data. The CPU controls input/output of data and decoding. Further, reference numeral 1015 designates multiplexed data to be decoded, and numeral 1016 designates a transmission clock.

FIG. 11 is a diagram for explaining the multiplexed data 1015 input to the apparatus. In FIG. 11, the multiplexed data is composed of first encoded digital data d11 to d15, clock information c11 and c12 of the first digital data, second encoded digital data d21 to d25, and clock information c21 and c22 of the second digital data. It is premised that the first and second digital data are produced by object encoding, and compressive encoding in different encoding apparatuses. In order to reproduce the first and second data accurately, clock information of the respective reproducing apparatuses is multiplexed as well.

Figure 12:
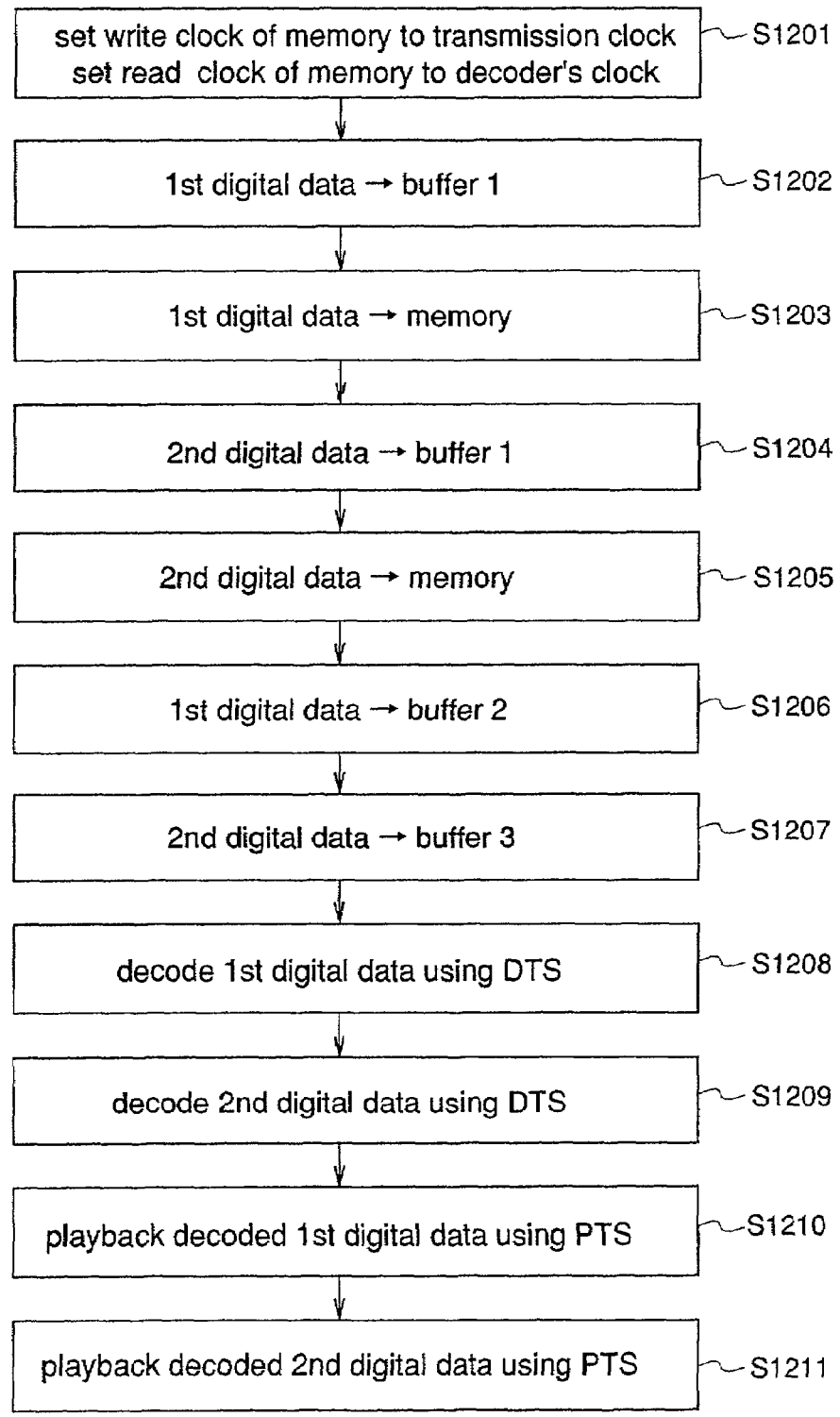
FIG. 12 is a flowchart illustrating a processing procedure of reproducing encoded data according to the fifth embodiment.

FIG. 12 is a flowchart showing the procedure for decoding the multiplexed data. Hereinafter, the operation of the encoded data reproducing apparatus according to this fifth embodiment will be described along the flowchart of FIG. 12, with reference to FIGS. 10 and 11.

Initially, in step 1201 of FIG. 12, write and road clocks of the memory 1012 are set. The write clock is set to the transmission clock 1016 input to the apparatus, and the read clock is set to a clock synchronized with the system clock of the decoding unit 102, which system clock is generated in the clock generation circuit 1021.

In step 1202, the first encoded digital data is input to the first buffer 1011 and, in step 1203, it is written in the memory 1012 in accordance with the set write clock. In steps 1204 and 1205, the second encoded digital data is processed in the same manner as steps 1202 and 1203, whereby the second encoded digital data is written in the memory 1012.

In step 1206, according to the set read clock, the first encoded digital data stored in the memory 1012 is read out and input to the second buffer 1022. Likewise, in step 1207, the second encoded digital data is input to the third buffer 1023. In step 1208, the decoder 1024 decodes the first encoded digital data using DTS (decoding time stamp). In step 1209, the decoder 1024 decodes the second encoded digital data using DTS. Further, in step 1210, the decoding result of the first encoded digital data, i.e., first decoded data, is represented according to PTS (presentation time stamp). In step 1211, the decoding result of the second encoded digital data, i.e., second decoded data, is represented according to PTS. Since DTS and PTS are usually described by relative values of reference clock information, even though the reference clock changes, only rereading is needed and the decoding is not adversely affected.

In the above-mentioned operation, the clock used for transmission of data from the memory 1012 to the second and third buffers 1022 and 1023 is not the clock of the encoding apparatus, which is extracted from the clock information multiplexed to the input multiplexed data 1015, but the clock of the reproducing (decoding) apparatus itself. So, there is no lag in clocks between the encoding apparatus and the decoding apparatus, and overflow or underflow of the buffer does not occur. Since the lag in clocks between the encoding apparatus and the decoding apparatus, i.e., a difference in transmission rates between them, is canceled when writing/reading of data into/from the memory 1012 are performed according to the respective rates, a sufficient capacity is required of the memory 1012. However, since the memory 1012 stores compressed encoded data, the capacity of the memory 1012 may be by far smaller than the memory capacity required in the case where a difference in transmission rates is canceled by a frame memory or the like after decoding.

As described above, according to the fifth embodiment of the invention, the encoded data reproducing apparatus is equipped with the memory 1012, and writing is performed at a write rate according to the input transmission clock while readout is performed at a read rate according to the clock used for decoding in this reproducing apparatus. Therefore, it is possible to accurately decode multiplexed data including digital data generated in encoding apparatuses with different reference clocks, such as object-encoded data.

Although in this fifth embodiment two kinds of encoded digital data, i.e., first and second encoded digital data, are processed, the number of encoded digital data to be processed is not restricted thereto. The reproducing apparatus can process three or more kinds of encoded digital data by adaptively enhancing the apparatus.

Embodiment 6

An encoded data reproducing apparatus according to a sixth embodiment of the present invention corrects asynchronization by temporarily storing data to be decoded in a memory, like the fifth embodiment of the invention.

Figure 13:
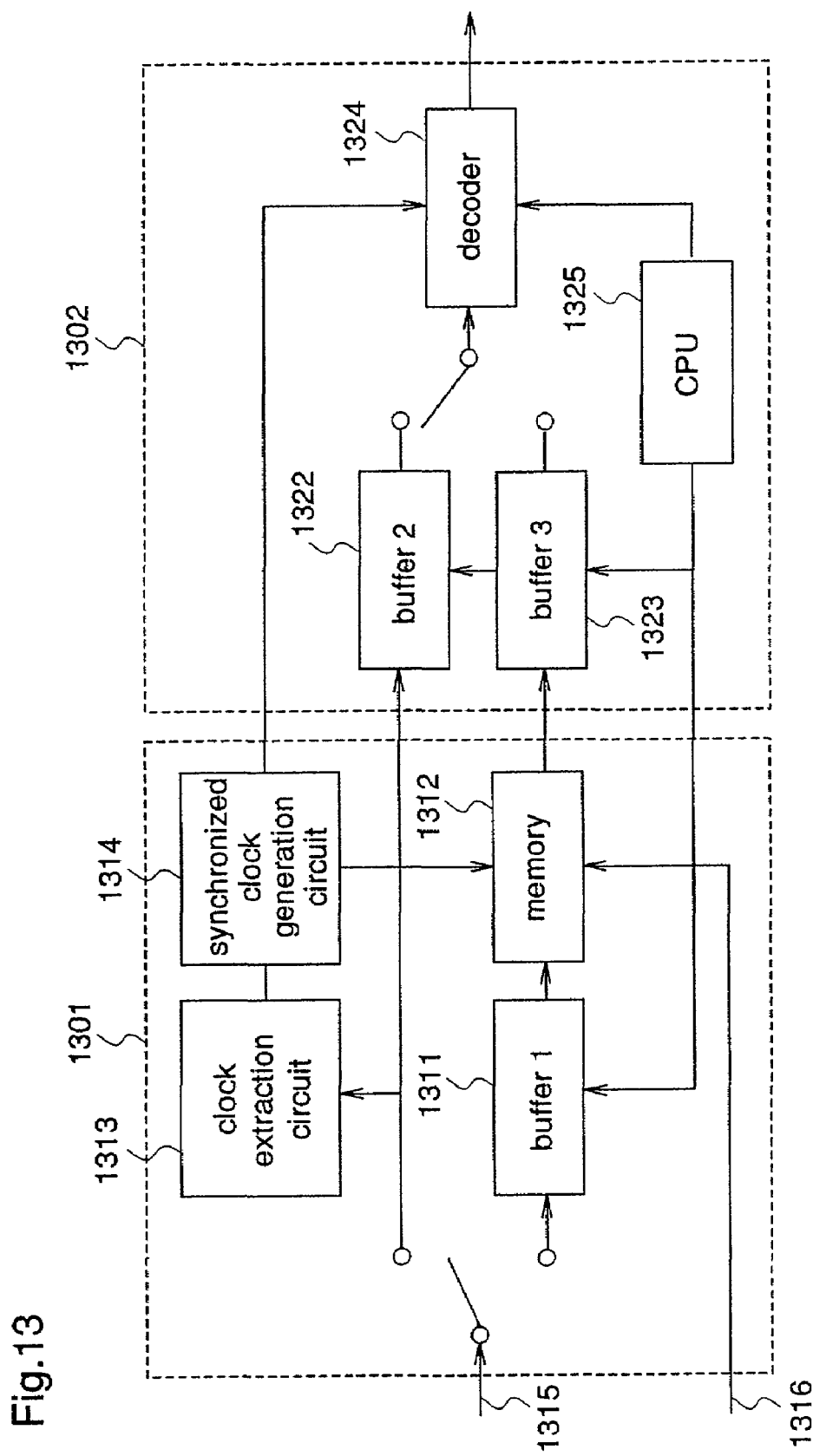
FIG. 13 is a block diagram illustrating an encoded data reproducing apparatus according to a sixth embodiment of the present invention.

FIG. 13 is a block diagram illustrating the structure of the encoded data reproducing apparatus according to the sixth embodiment of the invention. In FIG. 13, a clock extraction circuit 1313 separates and extracts clock information from input data, and outputs the extracted clock information to a synchronized clock generation circuit 1314. The synchronized clock generation circuit 1314 generates a clock synchronized with an input clock, i.e., a clock of a encoding apparatus in which encoded digital data to be input to the decoding apparatus is produced, by executing PLL control or the like, as in the prior art apparatus. The reproducing apparatus according to this sixth embodiment of the invention is identical to the reproducing apparatus according to the fifth embodiment except that the storage unit 1301 includes the clock extraction circuit 1313 and the synchronized clock generation circuit 1314, and the decoding unit 1302 includes no clock generation circuit.

Hereinafter, the operation of the encoded data reproducing apparatus according to this sixth embodiment will be described with emphasis on the difference from the apparatus according to the fifth embodiment. Multiplexed data 1315 input to the apparatus is identical to that described for the fifth embodiment (FIG. 11). While in the fifth embodiment both of the first and second encoded digital data included in the multiplexed data 1015 are input to the first buffer 1011 and the memory 1012, in this sixth embodiment only the second encoded digital data is input to the first buffer 1311. The first encoded digital data is not input to the first buffer 1311 and the memory 1312, but it is directly input to the second buffer 1322.

The clock extraction circuit 1313 extracts clock information from the first encoded digital data and outputs the clock information to the synchronized clock generation circuit 1314. The synchronized clock generating circuit 1314 generates a synchronized clock, and outputs the clock so that it is set as a clock used for readout from the memory 1312. Accordingly, the clock used for readout from the memory is synchronized with the first encoded digital data.

Writing of the second encoded digital data, which is stored in the first buffer 1311, into the memory 1312 is performed according to the input transmission clock 1316, like the fifth embodiment. However, for readout of data from the memory 1312, the reproducing apparatus according to this sixth embodiment uses the synchronized clock generated in the synchronized clock generation circuit 1314 while the reproducing apparatus according to the fifth embodiment uses the clock of decoding performed in the apparatus.

After the second encoded digital data read from the memory 1312 is input to the third buffer 1323, the same process steps as described for the fifth embodiment are carried out, except that the decoder 1324 of this sixth embodiment uses the synchronized clock generated in the synchronized clock generating circuit while the decoder 1024 of the fifth embodiment uses the clock generated in the clock generation circuit included in the decoding unit 1302.

As described above, in the encoded data reproducing apparatus according to this sixth embodiment, since the storage unit 1301 is equipped with the clock extracting circuit 1313 and the synchronized clock generation circuit 1314. The clock extracting circuit 1313 extracts clock information from the first encoded digital data included in the input multiplexed data, and the synchronized clock generation circuit 1314 generates a synchronized clock based on this clock information, which clock is used for readout of data from the memory 1312 and decoding by the decoder 1324. The first encoded digital data is decoded using an adapted clock, and only the second encoded digital data synchronized with a clock different from the clock for the first data is stored, through the first buffer 1311, in the memory 1312. Therefore, a difference in clocks is canceled, resulting in satisfactory synchronous reproduction.

The reproducing apparatus according to this sixth embodiment needs both the clock extracting circuit 1313 and the synchronized clock generation circuit 1314 while the apparatus according to the fifth embodiment needs only the clock generation circuit 1021. However, since the memory 1312 processes only one of the first and second digital data, the capacity of the memory 1312 may be smaller than the memory capacity required for the fifth embodiment.

While in the sixth embodiment two pieces of encoded digital data are input to the apparatus, three or more pieces of digital data may be input as described above for the fifth embodiment. Also in this case, clock information is extracted from one of the input digital data.

While in the fifth and sixth embodiments the first and second encoded digital data are input as multiplexed data, these data are not necessarily multiplexed data. That is, the first and second encoded data may be transmitted separately and decoded simultaneously.

Further, although in the fifth and sixth embodiments the transmission clock (1016 in FIG. 10, 1316 in FIG. 13) is transmitted separately from video or audio data, when the transmission clock is included in the first or second encoded digital data, it can be suitably extracted and used.

Furthermore, in the fifth and sixth embodiments, the decoding unit includes two, first and second, buffers and a decoder common to these buffers, and data output from these buffers are decoded in the decoder by time sharing. However, the second and third buffers may be physically united, or two decoders may be provided for the first and second digital data, respectively. Thus, there are various methods to implement the apparatus.

Moreover, in the fifth and sixth embodiments, the transmission clocks 1016 and 1316 are different from the clock generated by the clock generation circuit 1021 (fifth embodiment) and the clock generated by the synchronized clock generation circuit 1314 (sixth embodiment), respectively. However, when synchronous control is possible like a communication terminal, the transmission clock is synchronized with the clock generated by the clock generation circuit.

Embodiment 7

A clock conversion apparatus according to a seventh embodiment of the present invention performs clock conversion so that encoded data generated in plural encoding apparatuses can be decoded synchronously.

Figure 14:
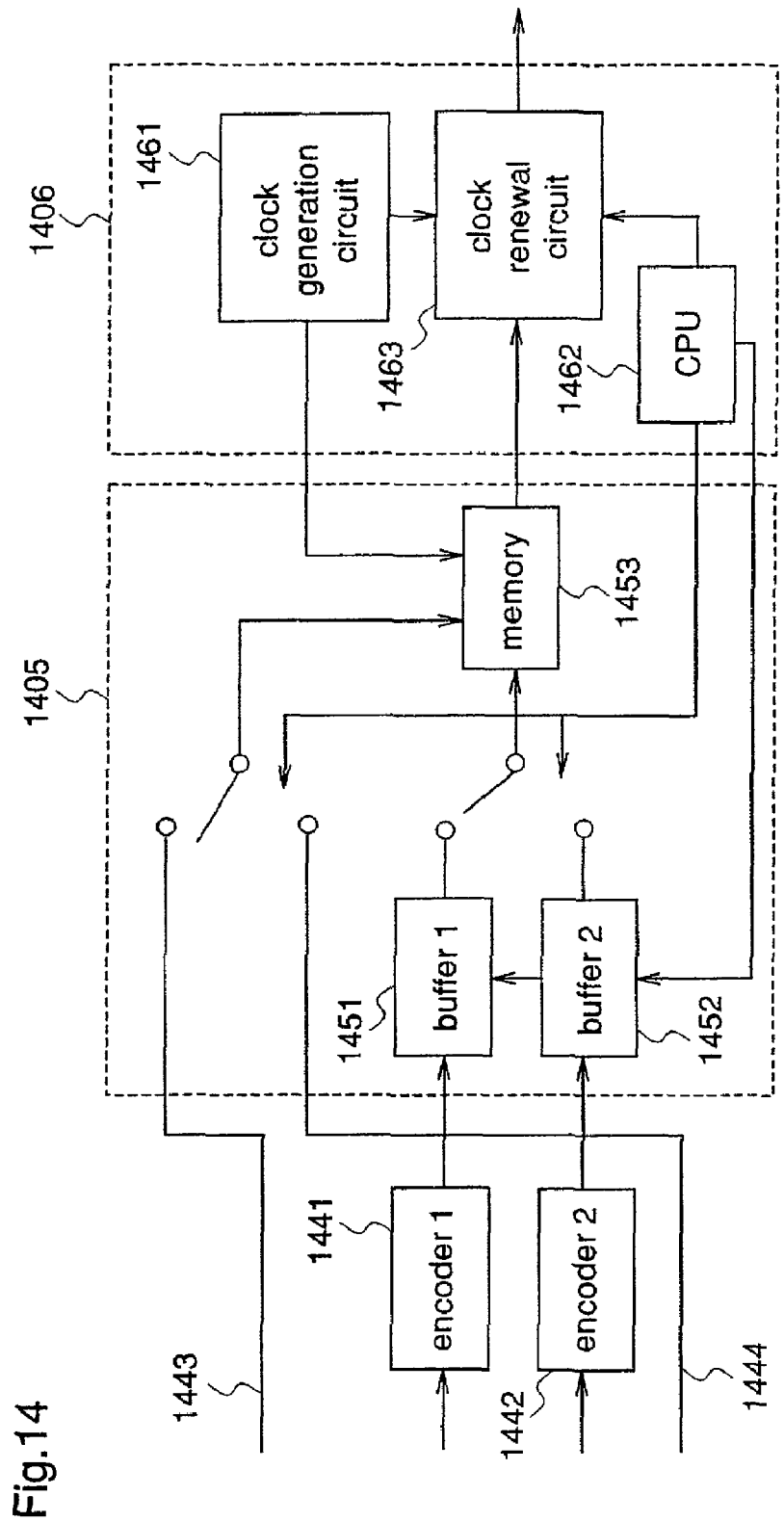
FIG. 14 is a block diagram illustrating a clock conversion apparatus according to a seventh embodiment of the present invention.

FIG. 14 is a block diagram illustrating the structure of the clock conversion apparatus according to the seventh embodiment of the invention. As shown in FIG. 14, the clock conversion apparatus comprises a storage unit 1405 and a clock conversion unit 1406. Coded digital data output from first and second encoders 1441 and 1442 are input to the clock conversion apparatus. These encoders are operated with different clocks.

The storage unit 1405 comprises a first buffer 1451, a second buffer 1452, and a memory 1453. The first buffer 1451 and the second buffer 1452 temporarily store the first encoded digital data output from the first encoder 1441 and the second encoded digital data output from the second encoder 1442, respectively. The memory 1453 stores one of the encoded digital data for clock conversion.

Figure 15:
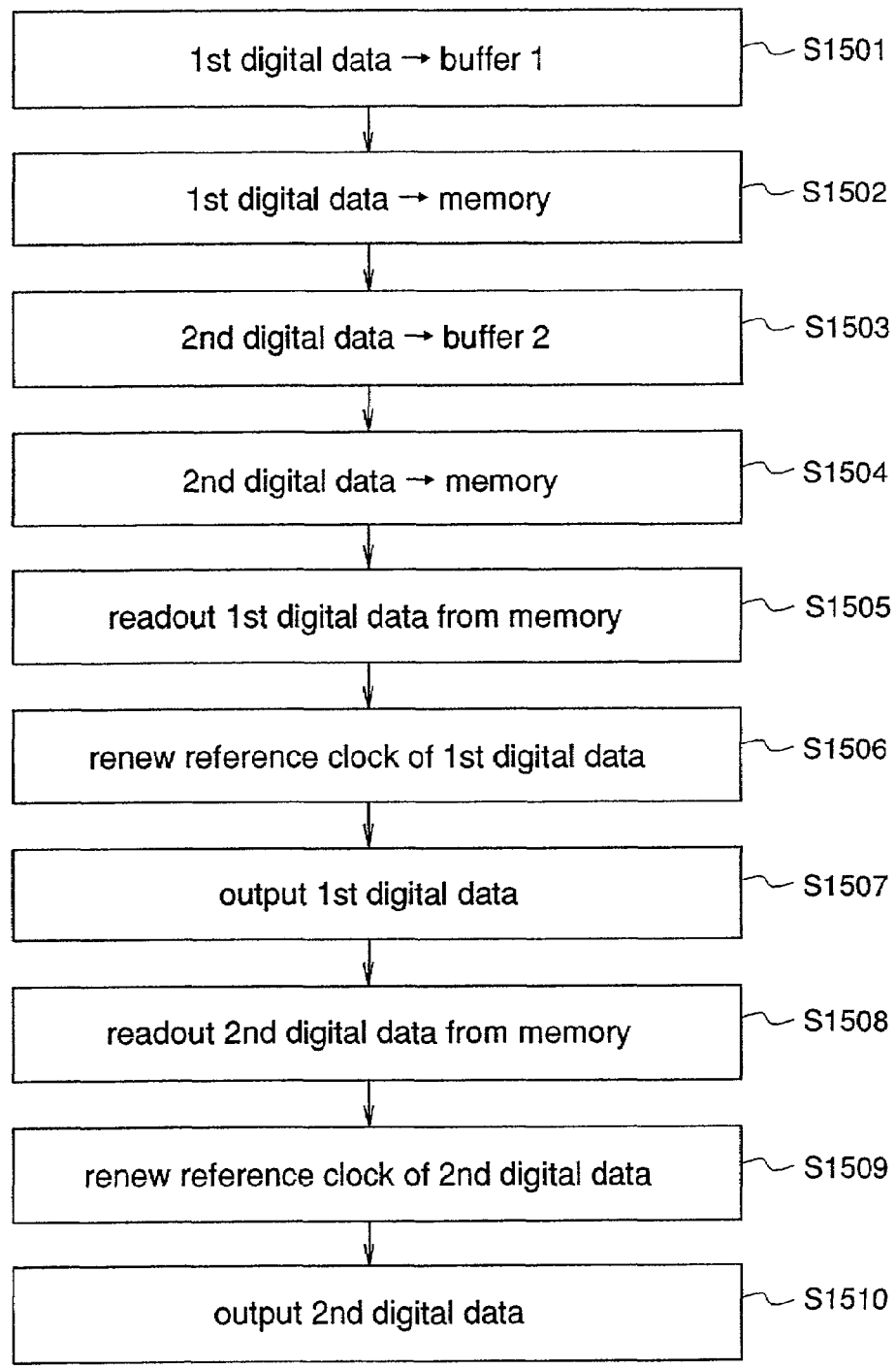
FIG. 15 is a flowchart illustrating a processing procedure of clock conversion according to the seventh embodiment.

The clock conversion unit 1406 comprises a clock generation circuit 1461, a clock renewal circuit 1463, and a CPU 1462. The clock generation circuit 1461 generates a clock. The clock renewal circuit 1463 renews clock information of the encoded digital data stored in the memory 1453. The CPU 1462 controls transmission of the encoded digital data to the memory 1453 and renewal of the clock renewal circuit 1462. FIG. 15 is a flowchart showing the procedure of control by the CPU 1462.

Hereinafter, the operation of the clock conversion apparatus according to the seventh embodiment will be described using FIGS. 14 to 16. The first and second encoders 1441 and 1442 perform encoding in accordance with respective clocks, and output first and second encoded digital data including respective clock information.

In step 1501, the first encoded digital data is input to the first buffer 1451 of the storage unit 1405. Subsequently, in step 1502, the first encoded digital data is read from the first buffer 1451 into the memory 1453 according to the transmission clock 1443. In steps 1503 and 1504, the second encoded digital data is processed in the same manner as steps 1501 and 1502.

In step 1505, the first encoded digital data is read from the memory 1453 into the clock renewal circuit 1463. Next, in step 1506, the clock renewal circuit 1463 renews the clock information of the first encoded digital data using a clock generated by the clock generation circuit 1461. In step 1507, renewed first encoded digital data is output from the clock renewal circuit 1463. In steps 1508 to 1510, the second encoded digital data is processed in the same manner as steps 1505 to 1507. As a result, multiplexed data on the basis of the clock-renewed first and second encoded digital data is output from the clock conversion apparatus according to this seventh embodiment.

The fundamental operation of the clock conversion apparatus according to this seventh embodiment is similar to the operation of the encoded data reproducing apparatus according to the fifth embodiment. That is, also in the clock conversion apparatus, the first and second encoded digital data are written in the memory 1453 using the clocks 1443 and 1444, respectively, and both of these data are read out using the clock generated by the clock generation circuit 1461, whereby a difference in clocks is canceled. However, since the clock conversion apparatus receives data from an encoding apparatus and outputs a stream to a decoding apparatus, it must output a stream in which correct clock information is multiplexed. For this purpose, the above-mentioned renewal of clock is executed in this seventh embodiment.

The clock renewal process according to this seventh embodiment will be described in more detail using FIGS. 16(a)-16(e). FIGS. 16(a)-16(e) show the contents of encoded digital data including periodical clock information. The abscissa shows time. Here, it is premised that the first and second digital data are compressed at the same transmission rate. The clock information included in the first digital data and the clock information included in the second digital data are represented by counter values of clocks generated in the first encoder 1441 and the second encoder 1442, respectively. These encoders are operated with a reference clock set to, for example, 27 MHz, so that the clock information is counted at a clock of 27 MHz. However, since there is a little difference in frequencies between the first encoder and the second encoder, though the clock information of the first digital data and the clock information of the second digital data increase equally by ten at a time as shown in FIGS. 16(a) and 16(b), the clock timing of the first digital data is different from that of the second digital data.

FIGS. 16(c) and 16(d) show the first and second encoded digital data that have been read from the memory and subjected to clock renewal. As shown in these figures, the clocks are aligned between the first digital data and the second digital data, and the counter values are renewed to consistent values, so that the first and second digital data can be processed with the same clock at decoding and reproduction. Since the clock conversion apparatus outputs multiplexed data, the output rate is doubled as shown in FIG. 16(e), and the counter value changes with the increase in the output rate.

As described above, according to the seventh embodiment of the invention, since the clock conversion apparatus is equipped with the storage unit 1405 and the clock renewal unit 1406, when plural pieces of data output from plural encoders of different clocks are input to the apparatus, the difference in clocks is canceled, and the input data are output as synchronously reproducible multiplexed data. Therefore, it is possible to produce encoded digital data that can be synchronously reproduced even in a reproducing apparatus having no large memory.

Although in this seventh embodiment two kinds of encoded digital data, i.e., first and second encoded digital data, are processed, the number of encoded digital data to be processed is not restricted thereto. The clock conversion apparatus can process three or more kinds of encoded digital data by adaptively enhancing the apparatus.

Embodiment 8

A clock conversion apparatus according to an eighth embodiment of the present invention performs clock conversion to realize synchronous reproduction of encoded data which are encoded in plural encoding apparatus.

Figure 17:
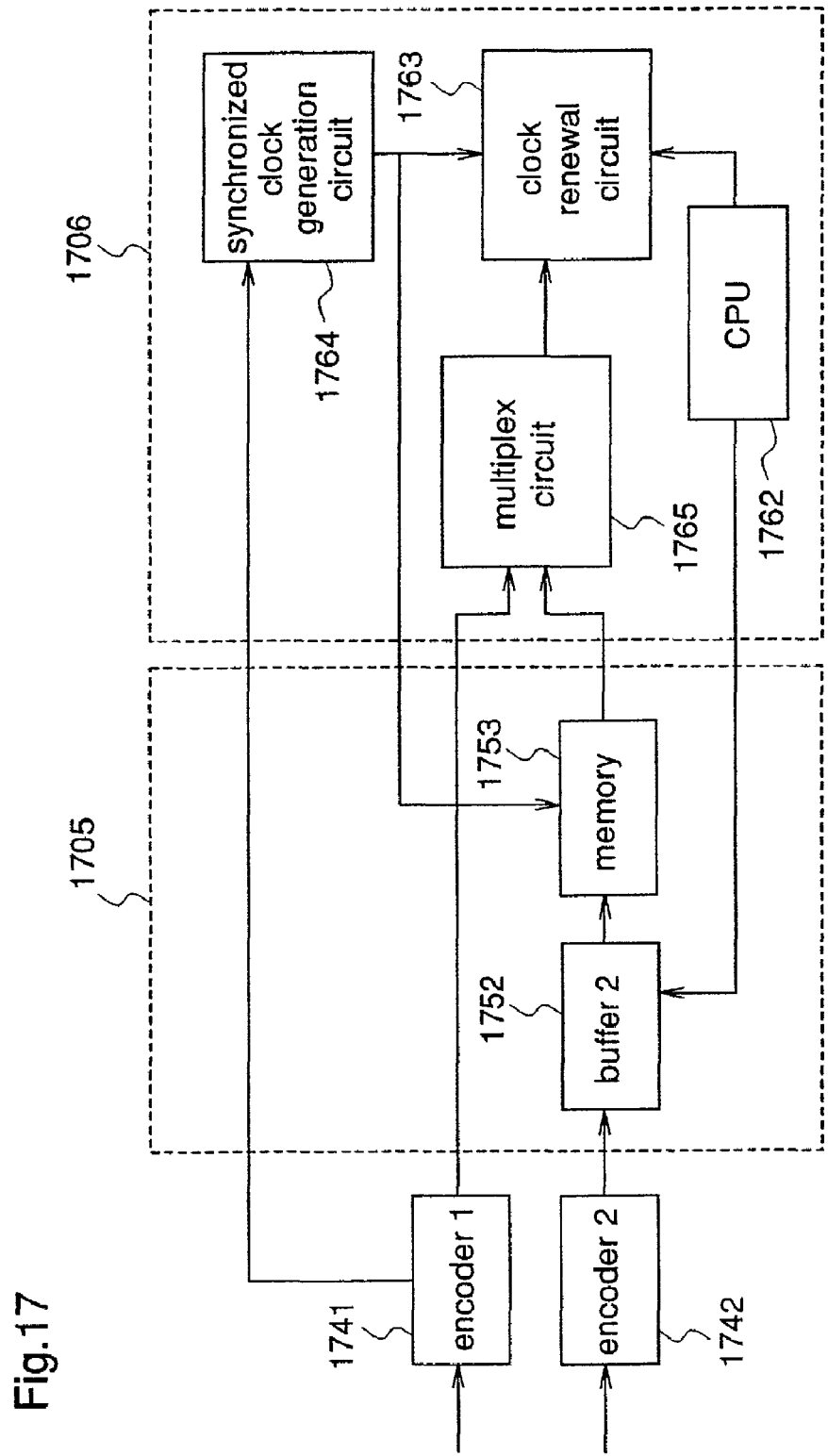
FIG. 17 is a block diagram illustrating a clock conversion apparatus according to an eighth embodiment of the present invention.

FIG. 17 is a block diagram illustrating the structure of the clock conversion apparatus according to the eighth embodiment of the invention. In FIG. 17, a synchronized clock generation circuit 1764 generates a synchronized clock according to a clock supplied from the first encoder 1741. A multiplexing circuit 1765 produces multiplexed data from encoded digital data. The clock conversion apparatus according to this eighth embodiment is identical to the clock conversion apparatus according to the seventh embodiment except that the storage unit 1705 includes no first buffer and the clock conversion unit 1706 includes the multiplexing circuit 1765 and the synchronized clock generation circuit 1764 in place of the clock generation circuit 1461 of the seventh embodiment.

Hereinafter, the operation of the clock conversion apparatus so constructed will be described with emphasis on the difference from the apparatus according to the seventh embodiment. While in the seventh embodiment the first and second encoded digital data are input through the buffers to the memory, in this eighth embodiment only the second encoded digital data is input through the buffer 1752 to the memory 1753.

In this eighth embodiment, the first encoder 1741 outputs a clock used for processing the first encoded digital data to the synchronized clock generation circuit 1764, and the synchronized clock generation circuit 1764 generates a synchronized clock according to the clock output from the first encoder 1741. According to the synchronized clock, readout of data from the memory 1753 performed and renewal of clock in the clock renewal circuit 1763 is performed.

While the first encoded digital data is input to the multiplexing circuit 1765 and multiplexed as it is, the second encoded digital data having a clock different from the clock of the first encoded digital data is input to the memory 1753, whereby a difference in clocks is canceled.

As described above, the clock conversion apparatus according to this eighth embodiment is equipped with the synchronized clock generation circuit 1764 and the multiplexing circuit 1765, and clock conversion is performed on the basis of the clock of the first encoded digital data, so that the first encoded digital data does not need to be stored. Therefore, as compared with the clock conversion apparatus according to the seventh embodiment, the same effects as provided by the seventh embodiment are obtained with less memory capacity.

Although in the eighth embodiment two pieces of digital data are input to the apparatus, three or more pieces of digital data may be input and, also in this case, clock information is extracted from one of these digital data.

Although in the seventh and eighth embodiments the reference clock information is renewed, when plural pieces of clock information are multiplexed and only one of the clocks is used for clock reproduction, the reference clock information included in the second digital data may be abandoned to simplify the clock renewal circuit.

Further, although in the seventh and eighth embodiments the first and second encoded digital data are output as multiplexed data, it is not always necessary to multiplex the first and second data when output, that is, these data may be transmitted separately.

Moreover, although in the seventh and eighth embodiments the first and second encoded digital data input to the clock conversion apparatus are supplied from the encoders, the supply source of data is not restricted thereto. For example, the clock conversion apparatus may receive encoded data stored in recording media, such as disks, or data stored in servers in network. In other words, the clock conversion apparatus can be used as a part of an encoding apparatus, or as a conversion apparatus for transmitting outputs from plural servers. In the latter case, the apparatus is disposed in the middle of the transmission line.

Embodiment 9

An encoded data reproducing apparatus according to a ninth embodiment of the invention performs decoding of encoded data produced in the clock conversion apparatuses according to the seventh and eighth embodiments.

Figure 18:
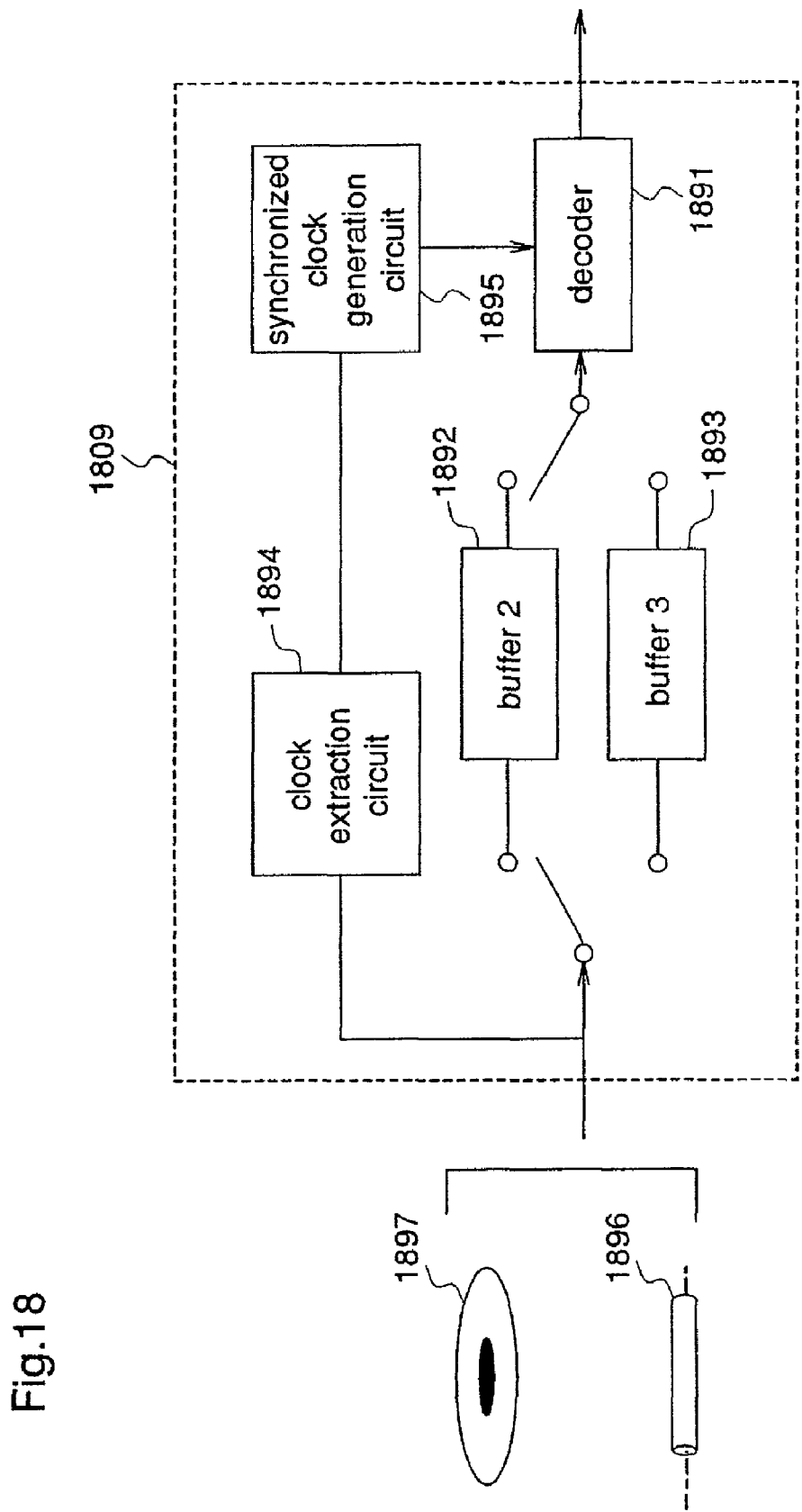
FIG. 18 is a block diagram illustrating an encoded data reproducing apparatus according to a ninth embodiment of the present invention.
Figure 19:
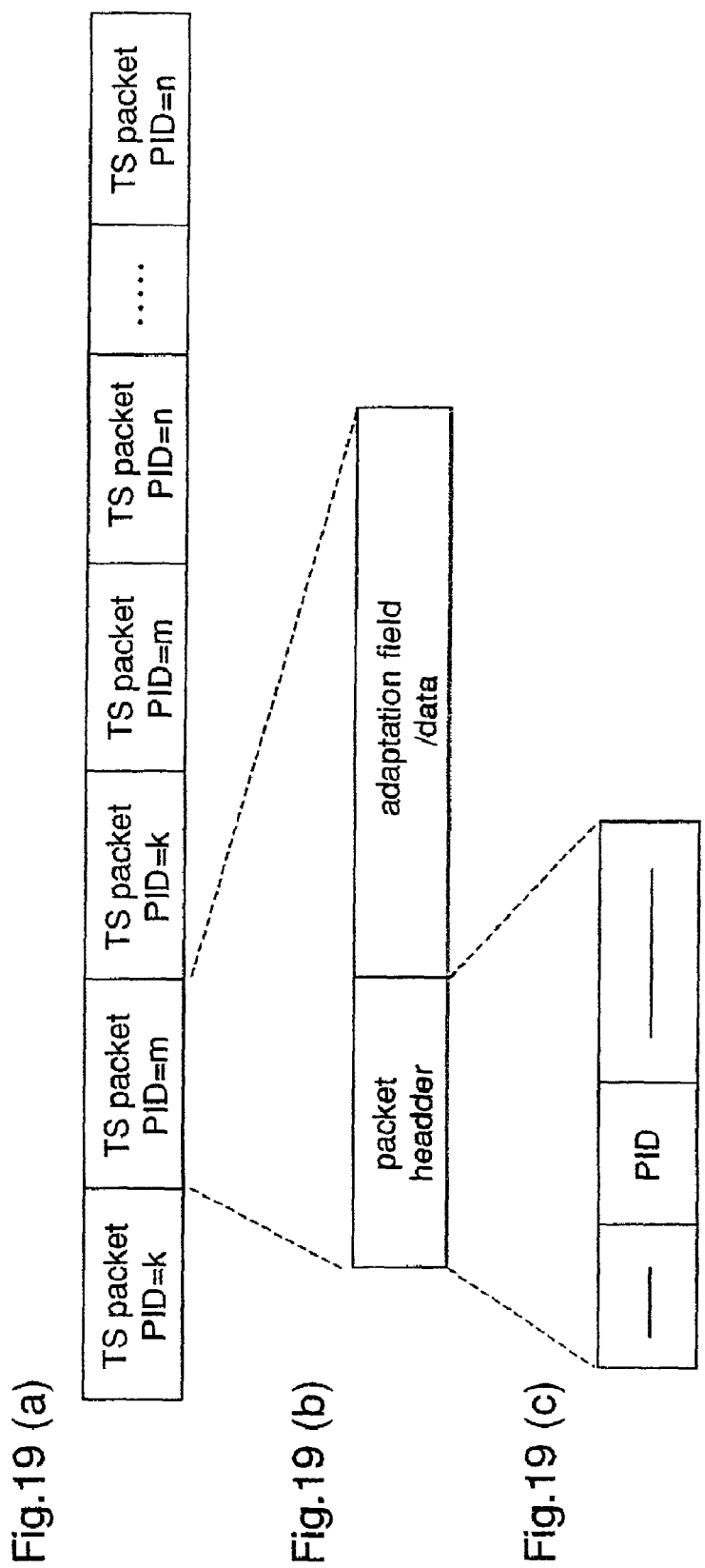
FIGS. 19(a) to 19(c) are diagrams for explaining transport streams used in MPEG2 data multiplexing method according to the prior art.
Figure 20:
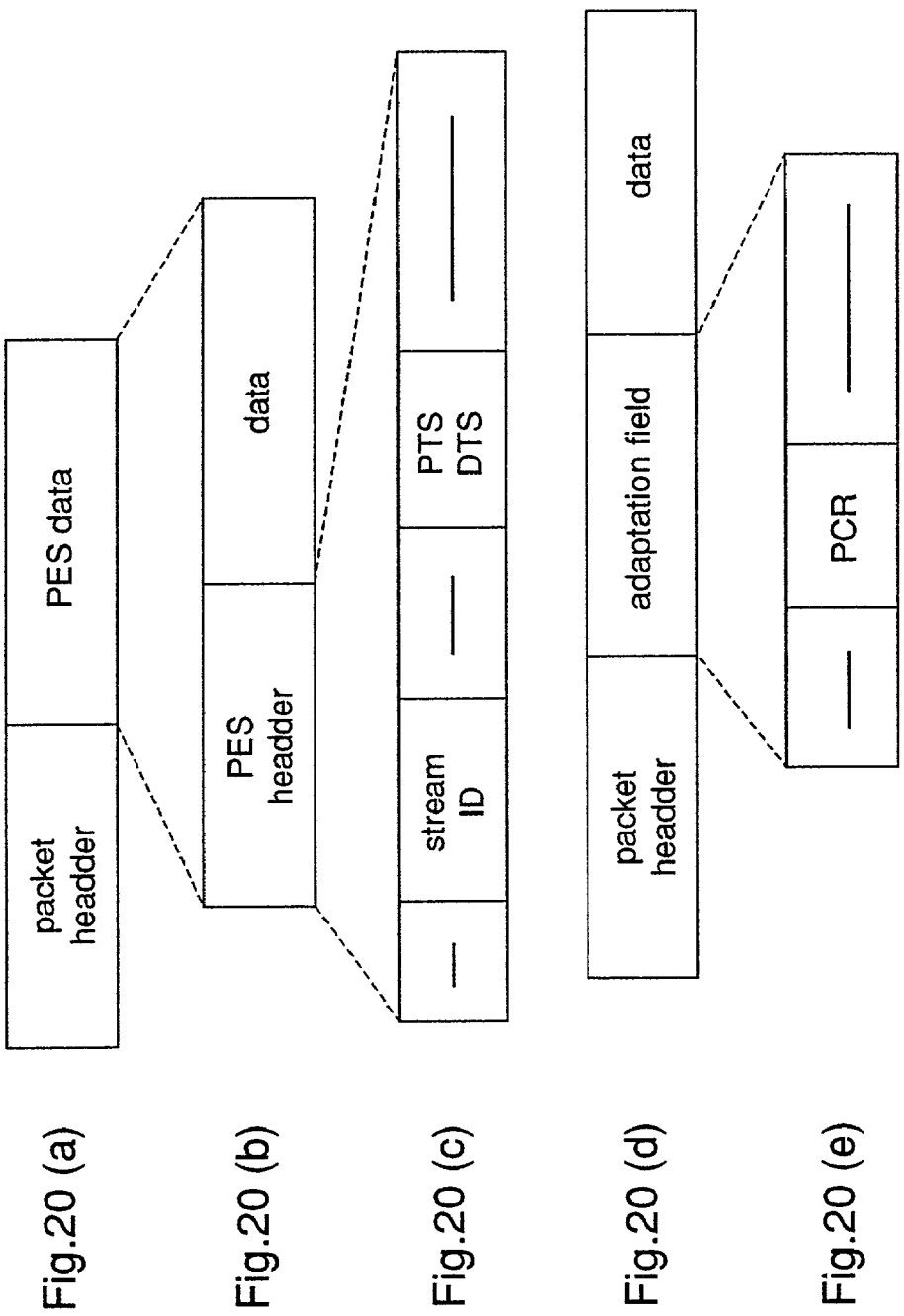
FIGS. 20(a) to 20(e) are diagrams for explaining packets employed in MPEG2 data multiplexing method according to the prior art.
Figure 21:
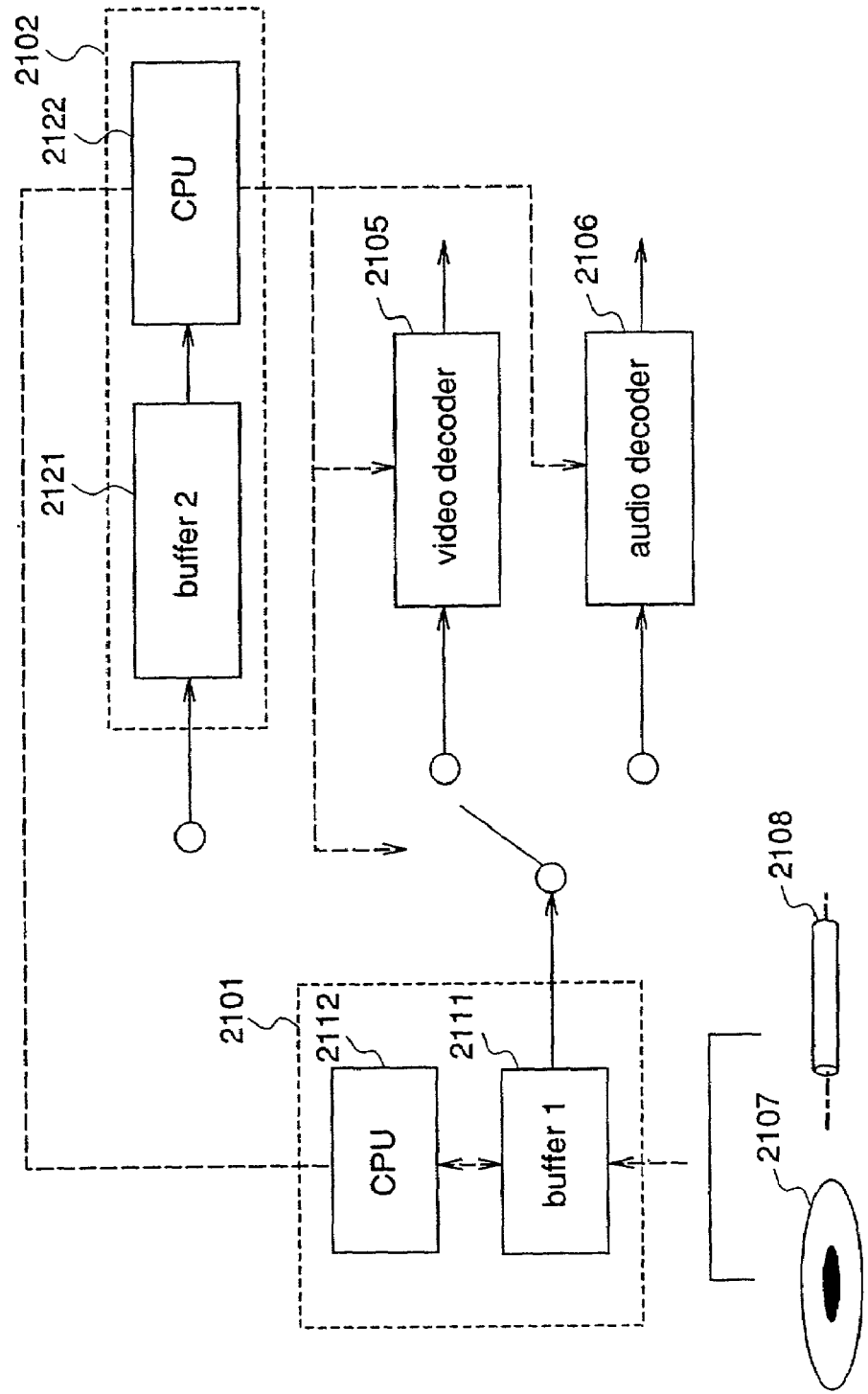
FIG. 21 is a block diagram illustrating a multiplexed data reproducing apparatus according to the prior art.
Figure 22:
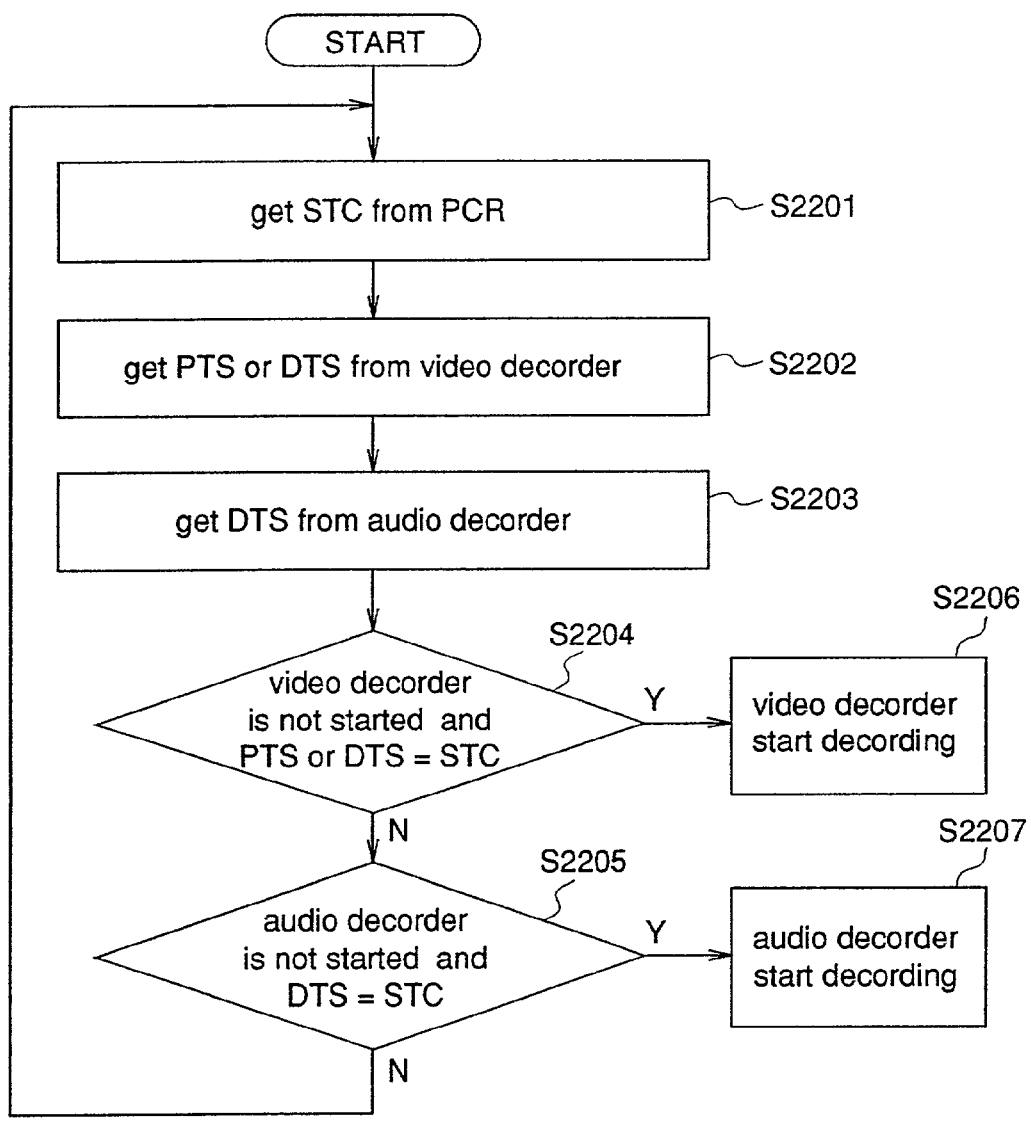
FIG. 22 is a flowchart illustrating a processing procedure in the multiplexed data reproducing apparatus according to the prior art.
Figure 23:
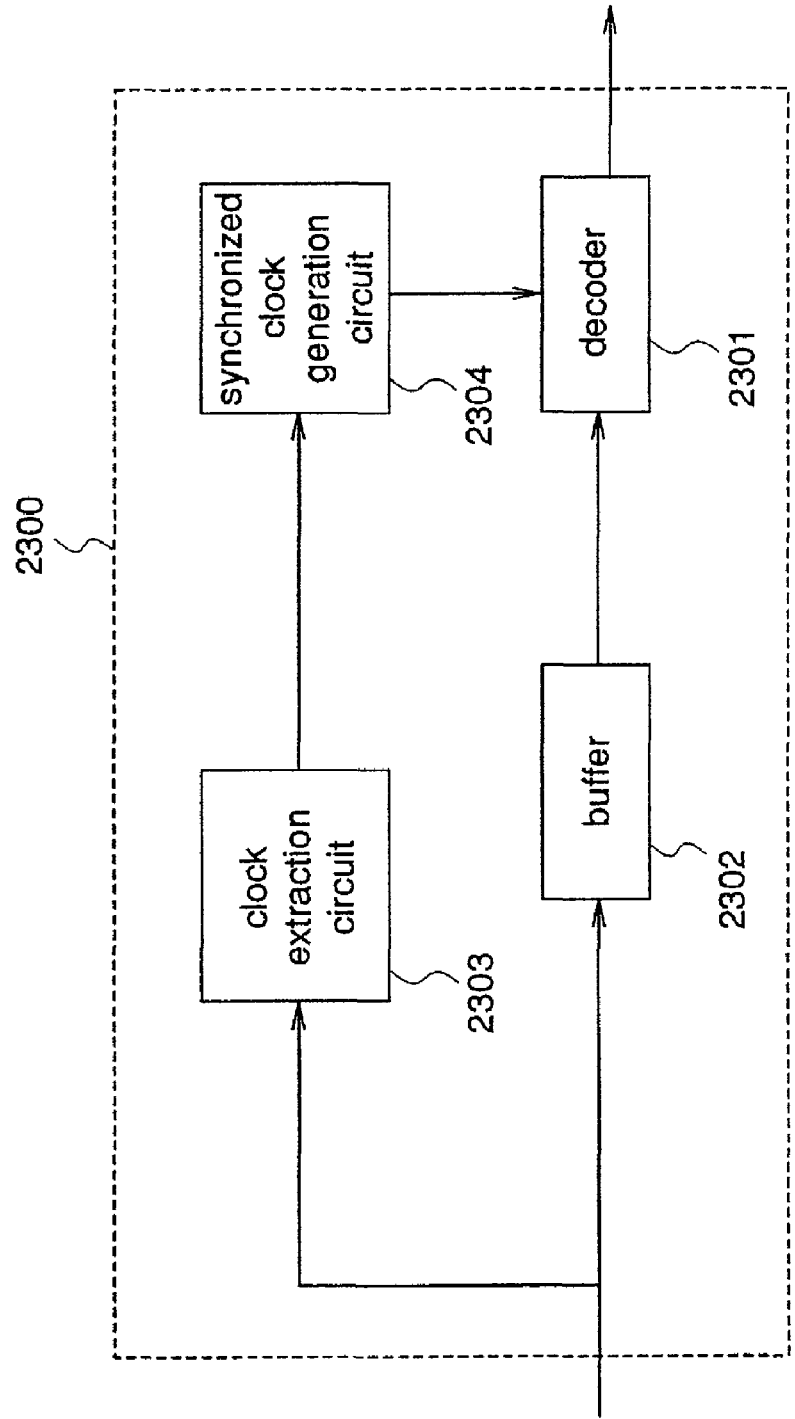
FIG. 23 is a block diagram illustrating an encoded data reproducing apparatus according to the prior art.
Figure 25:
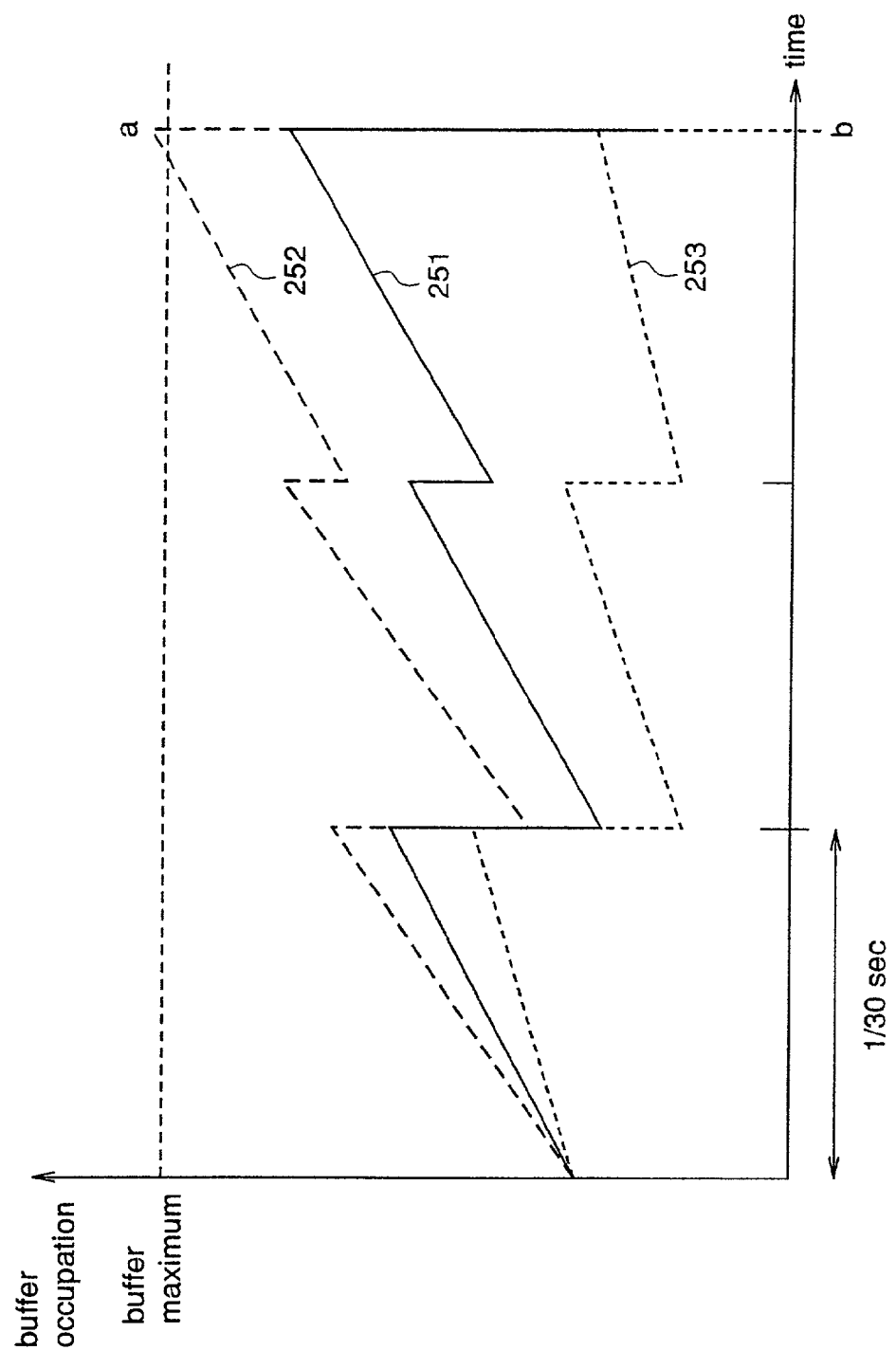
FIG. 25 is a diagram illustrating transition of a buffer in an encoded data reproducing apparatus according to the prior art.

FIG. 18 is a block diagram illustrating the structure of the encoded data reproducing apparatus 1089 according to the ninth embodiment of the invention. In the figure, a decoder 1891 decodes and reproduces compressed video or audio data. A second buffer 1892 and a third buffer 1893 temporarily store encoded digital data input to the apparatus. A clock extraction circuit 1894 extracts clock information from the input encoded digital data. A synchronized clock generation circuit 1895 generates a synchronized clock according to the input clock. Reference numerals 1896 and 1897 designate a transmission medium and a recording medium, respectively.

Hereinafter, the operation of the encoded data reproducing apparatus so constructed will be described. Multiplexed data or encoded data obtained in the apparatus according to the seventh or eighth embodiment is supplied from the transmission medium 1896 or the recording medium 1897 to the reproducing apparatus. Here, assumed that multiplexed data in which first and second encoded digital data and synchronized clock information are multiplexed is input to the reproducing apparatus.

The clock extraction circuit 1894 separates and extracts the clock information from the multiplexed data and outputs the clock information to the synchronized clock generation circuit 1895. The synchronized clock generation circuit 1895 generates a synchronized clock according to the clock information and outputs the synchronized clock to the decoder 1891.

On the other hand, the first and second digital data are separated from the multiplexed data and respectively input to the second and third buffers 1892 and 1893 to be stored temporarily. The decoder 1891 fetches the first or second encoded digital data from the second buffer 1982 or the third buffer 1893 according to the synchronized clock output from the synchronized clock generation circuit 1895, decodes the data, and outputs the decoded data from the apparatus. Since the clocks of the first and second encoded digital data are equalized in the clock conversion apparatus according to the seventh or eighth embodiment, even though the above-mentioned decoding is carried out using the same clock, accurate reproduction is performed without overflow or underflow of the buffers. Accordingly, the reproducing apparatus according to this ninth embodiment is simpler in structure than the reproduction apparatuses according to the fifth and sixth embodiments.

As described above, according to the ninth embodiment of the invention, since the encoded data reproducing apparatus is equipped with the decoder 1891, the buffers 1892 and 1893, the clock extraction circuit 1894, and the synchronized clock generation circuit 1895, the apparatus can perform decoding and reproduction well adapted to the encoded digital data processed in the clock conversion apparatus according to the seventh and eighth embodiments.

Although in this ninth embodiment multiplexed data is input to the reproducing apparatus, the input data is not restricted thereto. For example, two pieces of encoded digital data which are not multiplexed may be input directly to the second and third buffers, respectively.

Further, while in this ninth embodiment two kinds of encoded digital data, i.e., first and second encoded digital data, are processed, the number of the encoded digital data to be processed is not restricted thereto. The reproducing apparatus can process three or more kinds of encoded digital data by adaptively enhancing the apparatus.

In the above-mentioned fifth to eighth embodiments, a buffer or plural buffers is/are connected before a memory. However, such a buffer, which is generally implemented by a high-speed memory or the like, is not always necessary. When the memory is a high-speed memory capable of writing input data in a short time, the buffer can be dispensed with.

Furthermore, in the aforementioned embodiments, as a memory included in the storage unit, various kinds of recording media can be employed, for example, hard disk, optical disk, tape, and semiconductor memory such as DRAM or SRAM Moreover, in the aforementioned embodiments, compressively encoded video data and audio data are processed. However, text data and uncompressed data are also applicable to the apparatus in which decoding must be controlled using a clock multiplexed to transmitted data.

What is claimed is:

1. A multiplexed data producing apparatus which multiplexes N (N: integer) pieces of object data comprising at least one type of data from the group consisting of video data, audio data, and digital data, each object data including time information from an encoding apparatus for encoding data to be multiplexed to produce one piece of multiplexed data, said multiplexed data-producing apparatus comprising:
   a temporal storage means for temporarily storing N pieces of object data;
   a control means for renewing time information of at least one piece of object data so that plural pieces of object data are reproduced in synchronization with each other for N pieces of temporarily stored object data; and
   a multiplexing means for multiplexing the processed object data to produce multiplexed data,
   wherein the control means uses time information of specified object data of N pieces of object data as a reference, and produces synchronization control data comprising absolute time information and time precision information based on a difference between time information of object data except specified object data of N pieces of object data and the time information used as a reference, and the control means produces priority information indicating that the reference clock is obtained on the basis of time information of object data of N pieces of object data based on when the produced multiplexed data is decoded.

2. The multiplexed data producing apparatus of claim 1, wherein the control means extracts time information from specified object data of N pieces of object data, extracts video data, audio data, and digital data from object data except specified object data of N pieces of object data, produces a reference clock from extracted time information, and multiplexes video data, audio data, and digital data extracted from object data except specified object data using the reference clock to produce corrected object data.

3. The multiplexing data producing apparatus of claim 1, wherein the control means renews time information of object data except specified object data of N pieces of object data into the time information used as a reference.

4. The multiplexing data producing apparatus of claim 3, wherein the control means adds a special reproduction flag for correcting a difference in time precision between the specified object data and the object data except the specified object data.

5. The multiplexed data producing apparatus of claim 1, further comprising:
 a demultiplexing means for extracting data from the multiplexed data;
 a decoding means for decoding the extracted data; and
 a decoding control means for controlling the decoding so that the multiplexed data can be synchronized and reproduced.

6. The multiplexed data producing apparatus of claim 1, further comprising:
 a demultiplexing means for extracting data from the multiplexed data;
 a decoding means for decoding the extracted data; and
 a decoding control means for controlling the decoding means so that multiplexed data can be synchronized and reproduced by setting a reference clock of the encoded data reproducing apparatus.

7. The multiplexed data producing apparatus of claim 1, further comprising an encoded data recording medium for recording one piece of multiplexed data in which N pieces of object data are multiplexed, each of the N pieces of object data is for recording multiplexed data in which time information of the N pieces of object data is synchronized.

8. The multiplexed data producing apparatus of claim 1, further comprising an encoded data recording medium for recording one piece of multiplexed data in which N pieces of object data are multiplexed, each of the N pieces of object data is for recording multiplexed data.

9. The multiplexed data producing apparatus of claim 1, further comprising an encoded data transmission medium for transmitting one piece of multiplexed data in which N pieces of object data are multiplexed, each of the N pieces of object data is for transmitting multiplexed data in which time information of the N pieces of object data is synchronized.

10. The multiplexed data producing apparatus of claim 1, further comprising an encoded data transmission medium for transmitting one piece of multiplexed data in which N pieces of object data are multiplexed, each of the N pieces of object data for transmitting multiplexed data.

11. A method of producing multiplexed data for multiplexing N (N: integer) pieces of object data comprising at least one type of data from a group consisting of video data, audio data, and digital data, each object data comprising time information from an encoding apparatus for encoding data to be multiplexed, to produce one piece of multiplexed data, said method comprising:
 temporarily storing N pieces of object data;
 renewing time information of at least one piece of object data to reproduce N pieces of object data in synchronization with each other;
 using time information of specified object data of the N pieces of object data as a reference;
 producing synchronization control data comprising absolute time information and time precision information on the basis of a difference between time information of object data except the specified object data of the N pieces of object data and time information used as a reference;
 multiplexing the processed object data to produce multiplexed data; and
 producing priority information indicating that the reference clock is obtained from time information of object data of N pieces of object data in the order of when the produced multiplexed data is decoded.

12. The method of producing multiplexed data of claim 11, further comprising:
 extracting time information from specified object data of the N pieces of object data;
 extracting video data, audio data, and digital data from object data except specified object data of N pieces of object data;
 producing a reference clock from extracted time information; and
 multiplexing the extracted video data, audio data, and digital data to produce corrected object data using the reference clock.

13. The method of producing multiplexed data of claim 11, further comprising:
 renewing time information of object data except specified object data of N pieces of object data into the time information used as a reference.

14. A method of producing multiplexed data for multiplexing N (N: integer) pieces of object data comprising at least one type of data from a group consisting of video data, audio data, and digital data, each object data comprising time information from an encoding apparatus for encoding data to be multiplexed, to produce one piece of multiplexed data, said method comprising:
 temporarily storing N pieces of object data;
 using time information of specified object data of N pieces of object data as a reference;
 renewing time information of object data, except specified object data, of N pieces of object data, into the time information used as a reference, to reproduce N pieces of object data in synchronization with each other; and
 multiplexing the processed object data to produce multiplexed data;
 wherein a special reproduction flag for correcting a difference in time precision between object data except specified object data of N pieces of object data and specified object data is added to object data except specified object data.

* * * * *